(12) United States Patent
Hoshina et al.

(10) Patent No.: US 11,831,005 B2
(45) Date of Patent: Nov. 28, 2023

(54) ELECTRODE GROUP, BATTERY, AND BATTERY PACK

(71) Applicant: KABUSHIKI KAISHA TOSHIBA, Tokyo (JP)

(72) Inventors: Keigo Hoshina, Yokohama (JP); Masanori Tanaka, Kashiwazaki (JP); Yasuhiro Harada, Isehara (JP); Norio Takami, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 706 days.

(21) Appl. No.: 17/014,130

(22) Filed: Sep. 8, 2020

(65) Prior Publication Data

US 2020/0403219 A1 Dec. 24, 2020

Related U.S. Application Data

(63) Continuation of application No. PCT/JP2018/013924, filed on Mar. 30, 2018.

(51) Int. Cl.
*H01M 4/131* (2010.01)
*H01M 4/48* (2010.01)
(Continued)

(52) U.S. Cl.
CPC ........... *H01M 4/131* (2013.01); *H01M 4/366* (2013.01); *H01M 4/483* (2013.01); *H01M 4/505* (2013.01);
(Continued)

(58) Field of Classification Search
CPC ...... H01M 4/366; H01M 4/505; H01M 4/131; H01M 10/0587
See application file for complete search history.

(56) References Cited

U.S. PATENT DOCUMENTS 10,236,501 B2 3/2019 Takami et al.
10,355,274 B2 7/2019 Yoshida et al.
(Continued)

FOREIGN PATENT DOCUMENTS

CN 106299329 A 1/2017
CN 107195870 A 9/2017
(Continued)

OTHER PUBLICATIONS

Translation of the written opinion of the PCT (no date).*
International Search Report dated Jun. 12, 2018 in PCT/JP2018/013924 filed Mar. 30, 2018, 2 pages.

*Primary Examiner* — Amanda C. Walke
(74) *Attorney, Agent, or Firm* — Maier & Maier, PLLC

(57) ABSTRACT

According to one embodiment, an electrode group is provided. The electrode group includes a positive electrode active material-containing layer and a negative electrode active material-containing layer. The negative electrode active material-containing layer contains at least one titanium-containing composite oxide selected from the group consisting of a monoclinic niobium titanium composite oxide and an orthorhombic titanium-containing composite oxide. The electrode group satisfies the following formula:

$$6500 \leq A/B \leq 18500,$$

where A is an area [cm$^2$] of a portion of the negative electrode active material-containing layer that faces the positive electrode active material-containing layer, and B is a thickness [cm] of the electrode group.

6 Claims, 8 Drawing Sheets

(51) Int. Cl.
*H01M 4/505* (2010.01)
*H01M 4/525* (2010.01)
*H01M 10/0525* (2010.01)
*H01M 10/0587* (2010.01)
*H01M 4/36* (2006.01)
*H01M 4/02* (2006.01)

(52) U.S. Cl.
CPC ....... *H01M 4/525* (2013.01); *H01M 10/0525* (2013.01); *H01M 10/0587* (2013.01); *H01M 2004/027* (2013.01); *H01M 2004/028* (2013.01)

(56) References Cited

U.S. PATENT DOCUMENTS

| | | | |
|---|---|---|---|
| 10,505,233 | B2 | 12/2019 | Murashi et al. |
| 10,559,820 | B2 | 2/2020 | Kishi et al. |
| 11,228,031 | B2 * | 1/2022 | Hoshina ............... H01M 4/525 |
| 2015/0010820 | A1 | 1/2015 | Takami et al. |
| 2015/0243979 | A1 | 8/2015 | Nakahara et al. |
| 2016/0087275 | A1 | 3/2016 | Zhang et al. |
| 2016/0276663 | A1 | 9/2016 | Yoshida et al. |
| 2017/0271666 | A1 | 9/2017 | Kishi et al. |
| 2017/0271667 | A1 | 9/2017 | Yoshida et al. |
| 2018/0331362 | A1 | 11/2018 | Niwata et al. |
| 2019/0088982 | A1 * | 3/2019 | Sugizaki ............... H02J 7/14 |
| 2019/0296337 | A1 * | 9/2019 | Yasuda ............... H01M 10/425 |
| 2022/0093975 | A1 * | 3/2022 | Hoshina ............... H01M 4/525 |

FOREIGN PATENT DOCUMENTS

| | | | | |
|---|---|---|---|---|
| JP | 2010-272492 | A | | 12/2010 |
| JP | 2011-9202 | A | | 1/2011 |
| JP | 2014-167890 | A | | 9/2014 |
| JP | 2015-35420 | A | | 2/2015 |
| JP | 2015-159010 | A | | 9/2015 |
| JP | 2016-58264 | A | | 4/2016 |
| JP | 2016-66600 | A | | 4/2016 |
| JP | 2016-177974 | A | | 10/2016 |
| JP | 6189549 | B2 | | 8/2017 |
| JP | 2017-168352 | A | | 9/2017 |
| JP | 2017-168442 | A | | 9/2017 |
| JP | 2021048009 | A * | 3/2021 | .............. B60L 50/64 |
| JP | 2022144907 | A * | 10/2022 | |
| JP | 2023042830 | A * | 3/2023 | |
| WO | WO 2017/138309 | A1 | | 8/2017 |

* cited by examiner

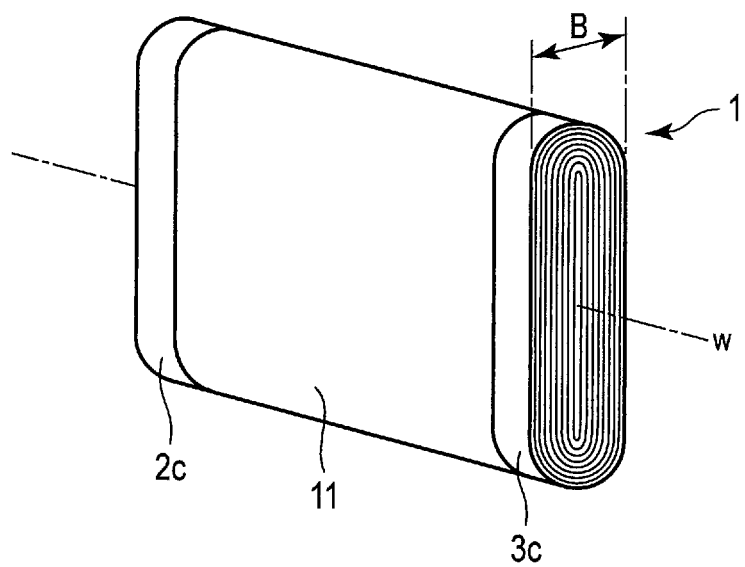
F I G. 1
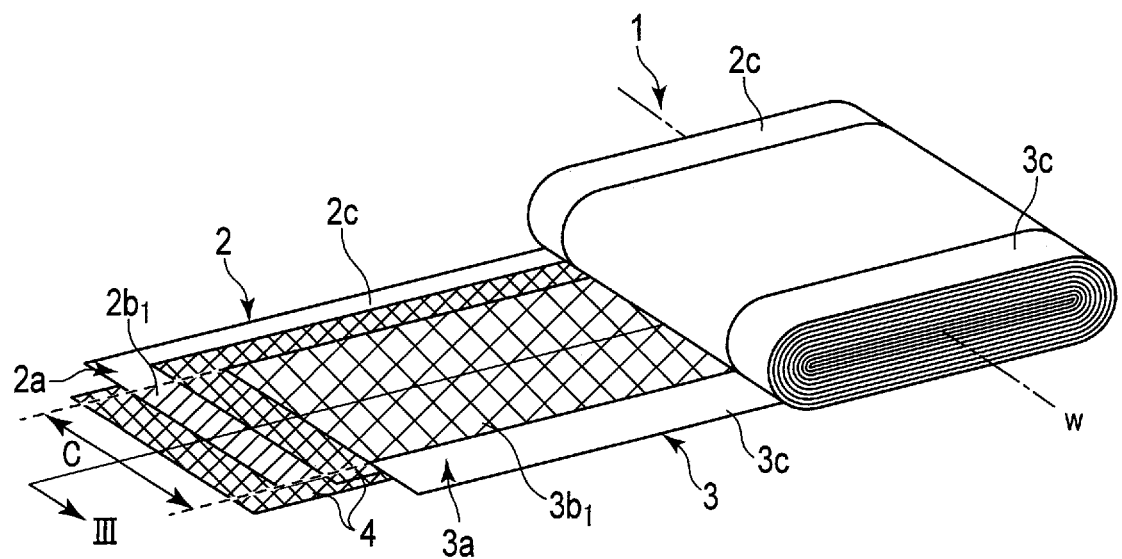
F I G. 2

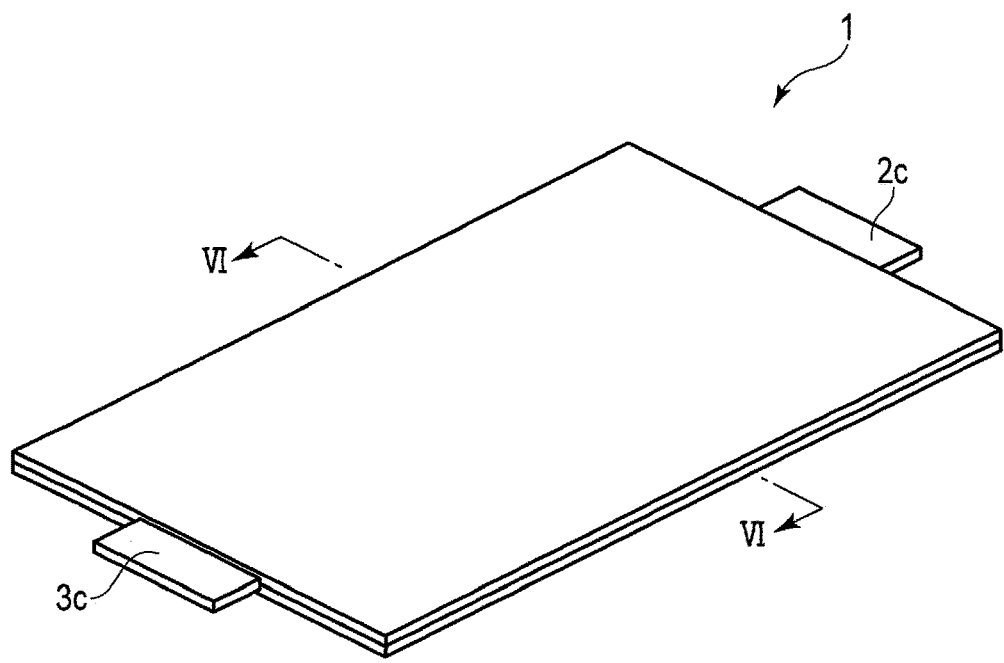
F I G. 5
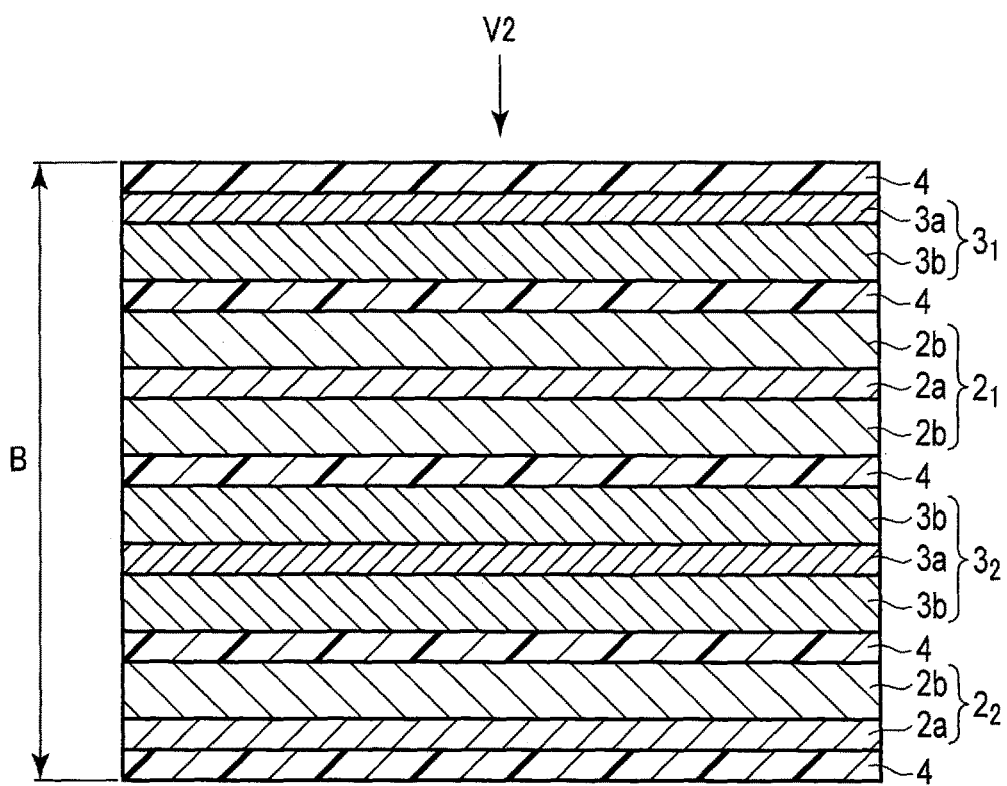
F I G. 6

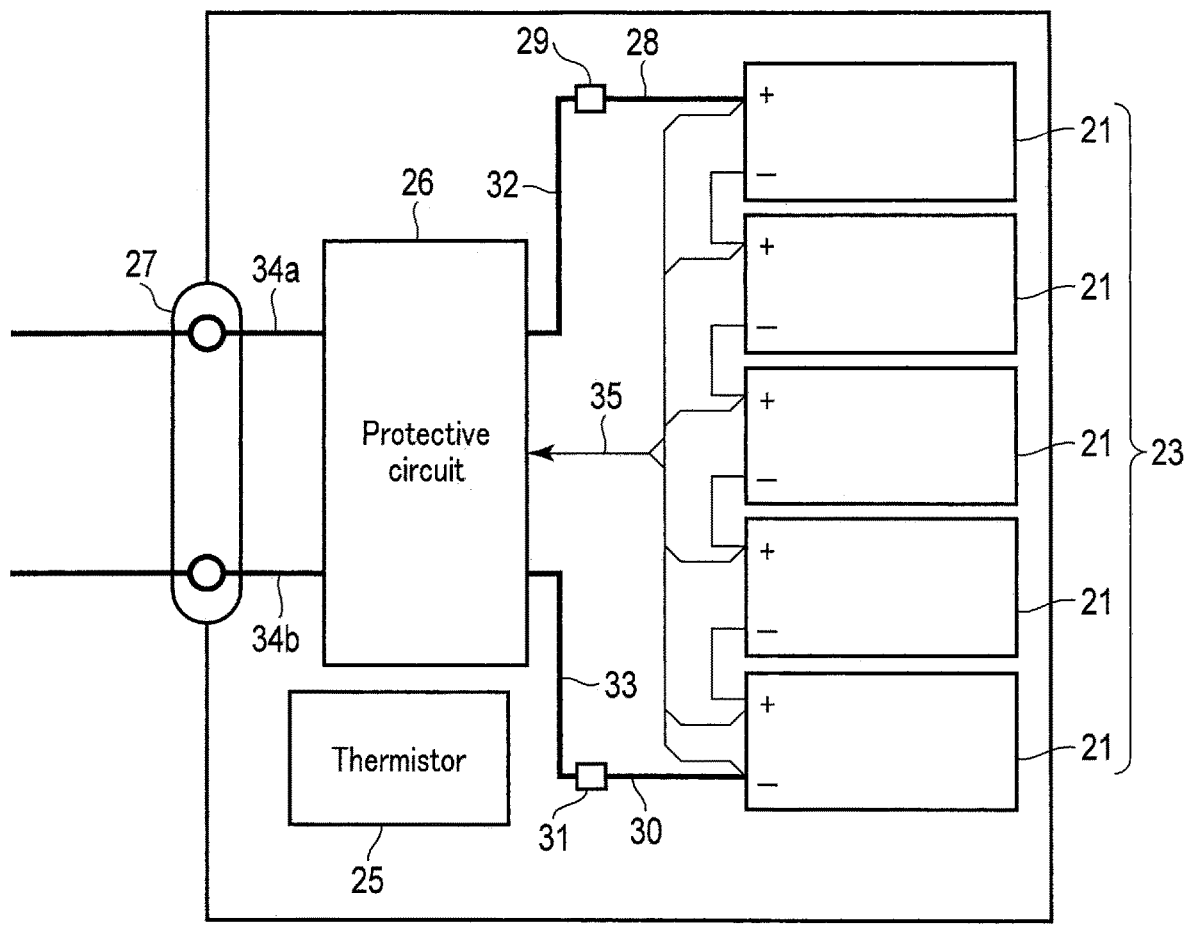
F I G. 13

ELECTRODE GROUP, BATTERY, AND BATTERY PACK

CROSS-REFERENCE TO RELATED APPLICATIONS

This application is a Continuation Application of PCT Application No. PCT/JP2018/013924, filed Mar. 30, 2018, the entire contents of which are incorporated herein by reference.

FIELD

Embodiments described herein relate generally to an electrode group, a battery, and a battery pack.

BACKGROUND

Nonaqueous electrolyte batteries are required to have improved energy density and longer life. As a measure for improving the energy density, for example, it is conceivable to increase the filling density of an electrode active material in an electrode or to increase an application amount of the electrode per unit area.

On the other hand, as a measure for increasing the life, for example, coating a surface of the active material with an inorganic substance, etc. or adding a substance that forms a film on the surface of the active material to a nonaqueous electrolyte can be given.

BRIEF DESCRIPTION OF THE DRAWINGS

FIG. 1 is a schematic perspective view of an electrode group of a first example according to an embodiment.

FIG. 2 is a partially developed perspective view of the electrode group shown in FIG. 1.

FIG. 5 is a schematic perspective view of an electrode group of a second example according to the embodiment.

FIG. 6 is a schematic cross-sectional view taken along a line VI-VI of the electrode group shown in FIG. 5.

FIG. 13 is a block diagram showing an electric circuit of the battery pack of FIG. 12.

DETAILED DESCRIPTION

Figure 3:
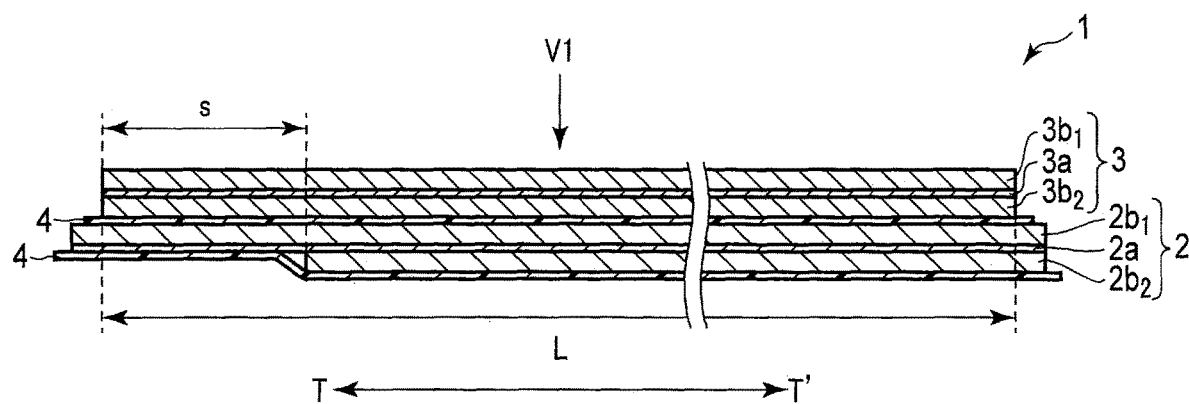
FIG. 3 is a developed cross-sectional view of the electrode group shown in FIGS. 1 and 2.

An object is to provide an electrode group which can realize a battery capable of exhibiting an excellent cycle life performance and an excellent rapid charging performance in a low temperature environment, a battery including the electrode group, and a battery pack including the battery.

According to one embodiment, an electrode group is provided. The electrode group includes a positive electrode including a positive electrode active material-containing layer and a negative electrode including a negative electrode active material-containing layer. The negative electrode active material-containing layer contains at least one titanium-containing composite oxide selected from the group consisting of a monoclinic niobium titanium composite oxide and an orthorhombic titanium-containing composite oxide. At least a part of the negative electrode active material-containing layer faces at least a part of the positive electrode active material-containing layer. The electrode group satisfies the following formula:

$$6500 \leq A/B \leq 18500,$$

where A is an area [cm$^2$] of a portion of the negative electrode active material-containing layer that faces the positive electrode active material-containing layer, and B is a thickness [cm] of the electrode group.

According to another embodiment, a battery is provided. The battery includes the electrode group according to the embodiment and an electrolyte.

According to another embodiment, a battery pack is provided. The battery pack includes the battery according to the embodiment.

Hereinafter, embodiments will be described with reference to the drawings. Note that the same reference numerals are given to the same components throughout the embodiments, and a repetitive explanation will be omitted. In addition, each of the drawings is a schematic diagram for explaining the embodiment and facilitating the understanding thereof, and the shape, dimensions, ratio, etc. are different from those of an actual device in some places, but these can be appropriately changed in design in consideration of the following explanations and publicly known techniques.

First Embodiment

According to a first embodiment, an electrode group is provided. This electrode group includes a positive electrode including a positive electrode active material-containing layer and a negative electrode including a negative electrode active material-containing layer. The negative electrode active material-containing layer contains at least one titanium-containing composite oxide selected from the group consisting of a monoclinic niobium titanium composite oxide and an orthorhombic titanium-containing composite oxide. At least a part of the negative electrode active material-containing layer faces at least a part of the positive electrode active material-containing layer. This electrode group satisfies the formula 6500≤A/B≤18500, where A is an area [cm$^2$] of a portion of the negative electrode active material-containing layer that faces the positive electrode active material-containing layer, and B is a thickness [cm] of the electrode group.

The monoclinic niobium titanium-containing oxide can exhibit a higher theoretical capacity than spinel-type lithium titanate. In addition, the orthorhombic titanium-containing composite oxide can have lithium ions inserted in and extracted from it at a potential lower than that of the spinel-type lithium titanate. However, as a result of extensive and intensive studies, it was found that among batteries including an electrode containing a titanium oxide, a battery including an electrode containing the monoclinic niobium titanium-containing oxide or orthorhombic titanium-containing composite oxide is inferior to a battery including an electrode containing the spinel-type lithium titanate in terms of cycle life if no countermeasures are taken.

The inventors of the present invention have obtained the following findings in the course of extensive and intensive studies to extend the life of a battery including an electrode containing the monoclinic niobium titanium-containing oxide or orthorhombic titanium-containing composite oxide.

The life of a battery is affected by heat in the battery. The heat in the battery depends on a heat balance between heat generation in an electrode and heat dissipation to the outside of the battery. In order to increase the life of the battery, it is effective to increase the heat dissipation in the heat balance between the heat generation and the heat dissipation to prevent thermal deterioration of materials included in an electrode group. For this purpose, it is also important to suppress heat generation in the battery.

The heat generated in the battery is mainly Joule heat generated from the electrode group during charging and discharging. An amount of the Joule heat depends on an apparent area (area A) of a portion where a negative electrode active material-containing layer and a positive electrode active material-containing layer face each other in the electrode group. Specifically, the resistance of the electrode group decreases as the area A increases. The smaller the resistance of the electrode group, the smaller the amount of the Joule heat generated in the electrode group.

In addition, for example, the larger the area A in the electrode group is, the easier it is to dissipate the heat from the electrode group. On the other hand, the smaller the smallest dimension (thickness B) from among three dimensions corresponding to a height, a width, and a depth of the electrode group is, the easier it is to dissipate the heat from the electrode group.

In view of the above, it is considered that a larger ratio A/B is more advantageous because heat dissipation can be made larger in the heat balance between heat generation and heat dissipation.

However, a decrease in thickness B of the battery leads to a decrease in battery capacity. In addition, in order to increase the area (area A) of the portion where the negative electrode active material-containing layer and the positive electrode active material-containing layer face each other when producing a battery having the same internal volume, it is necessary to reduce the volumes of the negative electrode active material-containing layer and the positive electrode active material-containing layer. Furthermore, in this case, the amounts of required current collectors and separators increase. In this case, therefore, a capacity per unit volume of the battery decreases. For example, when the battery capacity decreases as in this case, the resistance of the battery may increase. This resistance increase is noticeable particularly when a large current is applied. When a resistance value increases, a Joule heating value also increases.

In addition, as a result of extensive and intensive studies, it was found that in a battery including a negative electrode containing a monoclinic niobium titanium-containing oxide or an orthorhombic titanium-containing composite oxide, a rapid charging performance can be improved by increasing the temperature inside the battery during charging.

As a result of further study based on these findings, the electrode group according to the first embodiment was realized.

The negative electrode included in the electrode group according to the first embodiment includes a negative electrode active material-containing layer including at least one titanium-containing composite oxide selected from the group consisting of a monoclinic niobium titanium composite oxide and an orthorhombic titanium-containing composite oxide. The electrode group satisfies the formula: $6500 \leq A/B \leq 18500$, where A is an area [cm$^2$] of a portion of the negative electrode active material-containing layer that faces the positive electrode active material-containing layer, and B is a thickness [cm] of the electrode group.

In the electrode group according to the first embodiment, with a ratio A/B of 6500 or more, heat generation from the electrode group can be sufficiently suppressed, and heat dissipation from the electrode group can be sufficiently performed. In addition, with a ratio A/B of 18500 or less, the electrode group according to the first embodiment can exhibit a sufficient capacity, and thus an increase in resistance value can be sufficiently suppressed even when a large voltage is applied. Furthermore, since the electrode group according to the first embodiment includes the above-described negative electrode active material-containing layer containing at least one titanium-containing composite oxide and has a ratio A/B of 18500 or less, it is possible to generate heat sufficient to enhance the rapid charging performance of the battery during charging in a low-temperature environment. As a result, the electrode group according to the first embodiment can realize a battery that can exhibit an excellent cycle life and an excellent rapid charging performance in a low-temperature environment.

An example of an electrode group having a ratio A/B of less than 6500 is an electrode group in which the area A is too small with respect to the thickness B. Such an electrode group not only has a high resistance value but also cannot sufficiently dissipate heat. Another example of an electrode group having a ratio A/B of less than 6500 is an electrode group in which the thickness B is too large with respect to the area A. Such an electrode group cannot sufficiently dissipate heat generated in the electrode group.

One example of an electrode group having a ratio A/B of more than 18500 is an electrode group in which the thickness B is too small with respect to the area A. Such an electrode group has too low of a capacity and thus exhibits a high resistance value. Therefore, such an electrode group cannot sufficiently suppress heat generation. Another example of an electrode group having a ratio A/B of more than 18500 is an electrode group in which the area A is too large. In such an electrode group, the amount of heat that can be generated during charging is too low, and the rapid charging performance of the battery cannot be enhanced during charging in a low-temperature environment.

The ratio A/B is preferably in a range of $8000 \leq A/B \leq 13000$, and more preferably in a range of $9000 \leq A/B \leq 11000$.

In an electrode group in which a negative electrode active material-containing layer does not contain any of a monoclinic niobium titanium composite oxide and an orthorhombic titanium-containing composite oxide, improvement in rapid charging performance in a low-temperature environment using heat generation of the electrode group cannot be expected. For example, an electrode group in which the negative electrode active material-containing layer contains spinel-type lithium titanate and the ratio A/B is 18500 or less exhibits a rapid charging performance in a low-temperature environment that is comparable to that of an electrode group having the same configuration as that of the electrode group except that the ratio A/B exceeds 18500.

Next, the electrode group according to the first embodiment will be described in more detail.

The electrode group according to the first embodiment includes a positive electrode and a negative electrode. The positive electrode includes a positive electrode active material-containing layer. The negative electrode includes a negative electrode active material-containing layer.

The positive electrode can include, for example, a positive electrode current collector. The positive electrode current collector is, for example, shaped like a belt having two surfaces. The positive electrode active material-containing layer may be formed on both surfaces of the positive electrode current collector or may be formed on one surface of the positive electrode current collector. The positive electrode current collector may include a portion where the positive electrode active material-containing layer is formed only on one surface and a portion where the positive electrode active material-containing layer is formed on both surfaces. The positive electrode current collector may include a portion where the positive electrode active material-containing layer is not formed on any surface. This portion can be used as, for example, a positive electrode current collector tab. Alternatively, the positive electrode may include a positive electrode current collector tab separate from the positive electrode current collector.

The positive electrode active material-containing layer can contain, for example, a positive electrode active material. The positive electrode active material-containing layer may further contain an electro-conductive agent and a binder.

The negative electrode can include, for example, a negative electrode current collector. The negative electrode current collector is, for example, shaped like a belt having two surfaces. The negative electrode active material-containing layer may be formed on both surfaces of the negative electrode current collector, or may be formed on one surface of the negative electrode current collector. The negative electrode current collector may include a portion where the negative electrode active material-containing layer is formed only on one surface and a portion where the negative electrode active material-containing layer is formed on both surfaces. The negative electrode current collector may include a portion where the negative electrode active material-containing layer is not formed on any surface. This portion can be used as, for example, a negative electrode current collector tab. Alternatively, the negative electrode may include a negative electrode current collector tab separate from the negative electrode current collector.

The negative electrode active material-containing layer contains at least one titanium-containing oxide. The at least one titanium-containing oxide is selected from the group consisting of a monoclinic niobium titanium composite oxide and an orthorhombic titanium-containing composite oxide. The at least one titanium-containing oxide can be contained in the negative electrode active material-containing layer as a negative electrode active material. The negative electrode active material-containing layer may further contain an electro-conductive agent and a binder.

The electrode group according to the first embodiment may further include a separator. The separator is disposed, for example, between the positive electrode active material-containing layer and the negative electrode active material-containing layer. In other words, the negative electrode active material-containing layer can face the positive electrode active material-containing layer with the separator interposed therebetween.

The structure of the electrode group according to the first embodiment is not particularly limited.

For example, the electrode group according to the first embodiment can have a stack-type structure. In the electrode group having a stack-type structure, a plurality of positive electrodes and a plurality of negative electrodes are stacked, and a positive electrode active material-containing layer of each positive electrode and a negative electrode active material-containing layer of each negative electrode face each other. A separator may be disposed between the positive electrode active material-containing layer and the negative electrode active material-containing layer. In the electrode group having a stack-type structure, the area A [$cm^2$] is a sum of areas of portions of the negative electrode active material-containing layers of the negative electrodes that face the respective positive electrode active material-containing layers. The thickness B [cm] of the electrode group having a stack-type structure is a dimension of the electrode group in a direction in which the positive electrodes and the negative electrodes are stacked.

Alternatively, the electrode group according to the first embodiment can have, for example, a wound-type structure. The electrode group having a wound-type structure is a wound body in which a laminate of positive electrodes and negative electrodes is wound. In the electrode group having a wound-type structure, at least a part of a negative electrode active material-containing layer and at least a part of a positive electrode active material-containing layer face each other. A separator may be disposed between the positive electrode active material-containing layer and the negative electrode active material-containing layer. In the electrode group having a wound-type structure, the area A [$cm^2$] is a sum of areas of portions of the negative electrode active material-containing layers that face the positive electrode active material-containing layers in the wound electrode group.

The electrode group having a wound-type structure may be a flat wound-type electrode group or a cylindrical electrode group. The thickness B [cm] of the flat wound-type electrode group is the smallest dimension from among dimensions of the electrode group in three directions (x direction, y direction, and z direction) orthogonal to each other. The thickness B [cm] of the cylindrical electrode group is a length of a diameter of the cylinder.

The area A in an electrode group can be adjusted by, for example, adjusting an area of a negative electrode active material-containing layer, an area of a positive electrode active material-containing layer, and a manner in which the negative electrode active material-containing layer and the positive electrode active material-containing layer overlap each other. The area of the negative electrode active material-containing layer can be adjusted by, for example, changing an application width and an application length of a slurry containing a negative electrode active material. The area of the positive electrode active material-containing layer can be adjusted by, for example, changing an application width and an application length of a slurry containing a positive electrode active material. In addition, for example, by reducing the application width or application length of the slurry, the resistance value of the electrode can be increased and/or the capacity of the electrode can be reduced. In contrast, by increasing the application width or application length of the slurry, the resistance value of the electrode can be decreased and/or the capacity of the electrode can be increased.

The thickness B of an electrode group can be adjusted by adjusting, for example, thicknesses of a negative electrode active material-containing layer, a negative electrode current collector, a positive electrode active material-containing layer, a positive electrode current collector, and/or a separator. For example, by increasing the thickness of the active material-containing layer of each electrode, the resistance value of each electrode can be increased and the capacity of the electrode can be increased. However, when the capacity of the electrode increases, the capacity of the electrode group increases, and the battery as a whole can exhibit a low resistance value. Conversely, for example, by reducing the thickness of the active material-containing layer of each electrode, the resistance value of each electrode can be reduced and the capacity of each electrode can be reduced. In addition, for example, by increasing the thickness of the separator, the resistance of the electrode group can be increased and the capacity of the electrode group can be decreased. Conversely, by reducing the thickness of the separator, the resistance of the electrode group can be reduced and the capacity of the electrode group can be increased.

In the electrode group having a stack-type structure, for example, the thickness B can be changed by changing the number of stacked positive electrodes and negative electrodes. In the electrode group having a wound-type structure, for example, the thickness B can be changed by changing the number of windings. In the flat-shaped wound-type electrode group, the thickness B can be changed by changing pressing conditions, etc. to change a flatness ratio.

Next, each constituent member of the electrode group according to the first embodiment will be described in more detail.

(1) Positive Electrode

The positive electrode current collector is preferably an aluminum foil or an aluminum alloy foil containing one or more elements selected from Mg, Ti, Zn, Mn, Fe, Cu, and Si. The thickness of the positive electrode current collector is preferably from 8 μm to 20 μm, more preferably from 10 μm to 17 μm, and particularly preferably from 12 μm to 15 μm.

An example of the positive electrode active material is a composite oxide having a layered structure and represented by the general formula $Li_uMeO_2$ (Me=at least one selected from Ni, Co, and Mn). The composite oxide also includes composite oxides containing metal elements other than Me. Specific examples of the composite oxide include lithium nickel composite oxides (e.g., $Li_uNiO_2$), lithium cobalt composite oxides (e.g., $Li_uCoO_2$), lithium nickel cobalt composite oxides (e.g., $Li_uNi_{1-s}Co_sO_2$), lithium manganese cobalt composite oxides (e.g., $Li_uMn_sCo_{1-s}O_2$), lithium nickel cobalt manganese composite oxides (e.g., $Li_uNi_{1-s-t}Co_sMn_tO_2$), and lithium nickel cobalt aluminum composite oxides (e.g., $Li_uNi_{1-s-t}Co_sAl_tO_2$). Other examples of the positive electrode active material include lithium manganese composite oxides having a spinel-type structure (e.g., $Li_uMn_2O_4$ and $Li_uMn_{2-s}Al_sO_4$) and lithium phosphorus oxides having an olivine structure (e.g., $Li_uFePO_4$, $Li_uMnPO_4$, $Li_uMn_{1-s}Fe_sPO_4$, $Li_uCoPO_4$). In the above, it is preferred that $0<u≤1$, $0≤s≤1$, and $0≤t≤1$. These compounds can have Li inserted in and extracted from. As the active material, one of the above compounds may be used alone, or a mixture of a plurality of compounds may be used.

Among them, lithium manganese composite oxides having a spinel-type structure ($Li_uMn_2O_4$ and $Li_uMn_{2-s}Al_sO_4$), lithium cobalt composite oxides ($Li_uCoO_2$), lithium nickel cobalt composite oxides ($Li_uNi_{1-s}Co_sO_2$), lithium manganese cobalt composite oxides ($Li_uMn_sCo_{1-s}O_2$), lithium nickel cobalt manganese composite oxides (e.g., $Li_uNi_{1-s-t}Co_sMn_tO_2$), or lithium phosphorus oxides having an olivine structure (e.g., $Li_uFePO_4$, $Li_uMnPO_4$, $Li_uMn_{1-s}Fe_sPO_4$, $Li_uCoPO_4$) are preferably contained because high input/output characteristics and excellent life characteristics are easily obtained. In the above, it is preferred that $0<u≤1$, $0≤s≤1$, and $0≤t≤1$.

The positive electrode active material particularly preferably contains the lithium nickel cobalt manganese composite oxides. The positive electrode active material preferably contains the lithium nickel cobalt manganese composite oxides in a proportion of 70% by mass or more, and more preferably 90% by mass or more.

The electro-conductive agent that can be contained in the positive electrode can have an effect of improving a current collection performance and suppressing contact resistance between the active material and the current collector. Examples of the electro-conductive agent include carbonaceous materials, such as carbon black (e.g., acetylene black), graphite, carbon nanofibers, and carbon nanotubes. As the carbonaceous material, one of these may be used alone, or a plurality of carbonaceous materials may be used.

The binder can have an effect of binding the active material, electro-conductive agent, and current collector. Examples of the binder include polytetrafluoroethylene (PTFE), polyvinylidene fluoride (PVdF), fluororubber, styrene-butadiene rubber, acrylic resin or a copolymer thereof, polyacrylic acid, and polyacrylonitrile.

The positive electrode active material, electro-conductive agent, and binder in the positive electrode active material-containing layer are preferably blended in proportions of 80% by mass to 95% by mass, 3% by mass to 18% by mass, and 2% by mass to 17% by mass, respectively. When the amount of the electro-conductive agent is 3% by mass or more, the above-described effect can be exhibited. When the amount of the electro-conductive agent is 18% by mass or less, decomposition of the electrolyte on a surface of the electro-conductive agent during high-temperature storage can be reduced. When the amount of the binder is 2% by mass or more, sufficient electrode strength can be obtained. When the amount of the binder is 17% by mass or less, the amount of the binder, which is an insulating material in the positive electrode, can be reduced so as to reduce the internal resistance.

The thickness of the positive electrode active material-containing layer is preferably from 25 μm to 60 μm, and more preferably from 30 μm to 50 μm. A weight per area of 1 m² of the positive electrode active material-containing layer is preferably from 40 g to 150 g, and more preferably from 50 g to 100 g. These thicknesses and weights are parameters for the positive electrode active material-containing layer formed on one surface of the positive electrode current collector.

(2) Negative Electrode

The negative electrode current collector is preferably formed of an aluminum foil or an aluminum alloy foil containing elements such as Mg, Ti, Zn, Mn, Fe, Cu, and Si. The thickness of the negative electrode current collector is preferably from 8 μm to 20 μm, more preferably from 10 μm to 17 μm, and particularly preferably from 12 μm to 15 μm.

The monoclinic niobium titanium composite oxide is a niobium-titanium composite oxide having a so-called monoclinic crystal structure. An example of the monoclinic niobium titanium composite oxide is a composite oxide having a composition represented by the general formula $Li_xTi_{1-y}M1_yNb_{2-z}M2_zO_{7+δ}$, where M1 is at least one selected from the group consisting of Zr, Si, and Sn, and M2 is at least one selected from the group consisting of V, Ta, and Bi. The subscripts are within ranges of $0≤x≤5$, $0≤y<1$, $0≤z<2$, and $-0.3≤δ≤0.3$, respectively. A specific example of the monoclinic niobium titanium composite oxide is a composite oxide having a composition represented by the general formula $Li_xNb_2TiO_7$ (0≤x≤5).

Another example of the monoclinic niobium titanium composite oxide is a composite oxide having a composition represented by the general formula $Li_xTi_{1-y}M3_{y+z}Nb_{2-z}O_{7-\delta}$, where M3 is at least one selected from Mg, Fe, Ni, Co, W, Ta, and Mo. The subscripts are within ranges of 0≤x≤5, 0≤y<1, 0≤z<2, and −0.3≤δ≤0.3, respectively.

An example of the orthorhombic titanium-containing composite oxide is a compound represented by $Li_{2+a}M(I)_{2-b}Ti_{6-c}M(II)_dO_{14+\sigma}$, where M(T) is at least one selected from the group consisting of Sr, Ba, Ca, Mg, Na, Cs, Rb, and K, and M(II) is at least one selected from the group consisting of Zr, Sn, V, Nb, Ta, Mo, W, Y, Fe, Co, Cr, Mn, Ni, and Al. The subscripts in the composition formula are 0≤a≤6, 0≤b<2, 0≤c<6, 0≤d<6, and −0.5≤σ≤0.5, respectively. A specific example of the orthorhombic titanium-containing composite oxide is $Li_{2+a}Na_2Ti_6O_{14}$ (0≤a≤6).

The electro-conductive agent that can be contained in the negative electrode can have an effect of improving a current collection performance and suppressing contact resistance between the active material and the current collector. Examples of the electro-conductive agent include carbonaceous materials, such as carbon black (e.g., acetylene black), graphite, carbon nanofibers, and carbon nanotubes. As the carbonaceous material, one of these may be used alone, or a plurality of carbonaceous materials may be used.

The binder can have an effect of binding the active material, electro-conductive agent, and current collector. Examples of the binder include polytetrafluoroethylene (PTFE), polyvinylidene fluoride (PVdF), fluororubber, styrene-butadiene rubber, acrylic resin or a copolymer thereof, polyacrylic acid, and polyacrylonitrile.

A mixing ratio of the negative electrode active material, electro-conductive agent, and binder in the negative electrode active material-containing layer is preferably in a range of from 70% by mass to 96% by mass for the negative electrode active material, from 2% by mass to 28% by mass for the negative electrode conductive agent, and from 2% by mass to 28% by mass for the binder. When the amount of the electro-conductive agent is less than 2% by mass, the current collection performance of the negative electrode active material layer may decrease, and large current characteristics may decrease. When the amount of the binder is less than 2% by mass, the binding property between the negative electrode active material layer and the negative electrode current collector may decrease, and the cycle characteristics may decrease. On the other hand, in view of high capacity, it is preferred that each of the electro-conductive agent and the binder has an amount of 28% by mass or less.

The thickness of the negative electrode active material-containing layer is preferably from 20 μm to 70 μm, more preferably from 25 μm to 65 μm, and particularly preferably from 30 μm to 45 μm. A weight per area of 1 m² of the negative electrode active material-containing layer is preferably from 35 g to 150 g, and more preferably from 50 g to 100 g. These thicknesses and weights are parameters for the negative electrode active material-containing layer formed on one surface of the negative electrode current collector.

(3) Separator

As the separator, for example, a porous film formed of a material such as polyethylene, polypropylene, polyethylene terephthalate, cellulose, or polyvinylidene fluoride (PVdF), a synthetic resin non-woven fabric, etc. can be used. Furthermore, a separator having inorganic compounds applied onto the porous film can also be used.

The thickness of the separator is preferably from 8 μm to 25 μm, and more preferably from 10 μm to 15 μm.

Next, an example of the electrode group according to the first embodiment will be specifically described with reference to the drawings.

FIG. 1 is a schematic perspective view of an electrode group of a first example according to the embodiment. FIG. 2 is a partially developed perspective view of the electrode group shown in FIG. 1. FIG. 3 is a developed cross-sectional view of the electrode group shown in FIGS. 1 and 2. FIG. 3 is a schematic cross-sectional view of a laminate obtained by further developing the electrode group shown in FIGS. 1 and 2 from the state shown in FIG. 2, as observed in a cross section taken along a line III partially shown in FIG. 2.

An electrode group 1 shown in FIGS. 1 to 3 has a flat wound-type structure. The electrode group 1 is wound around a winding axis w. An insulating tape 11 is wound around the electrode group 1 to maintain the wound state. The electrode group 1 has a thickness B [cm]. The thickness B [cm] is the smallest dimension from among dimensions of the electrode group 1 in three directions orthogonal to each other.

The electrode group 1 includes a negative electrode 2 and a positive electrode 3 shown in FIGS. 2 and 3.

As shown in FIGS. 2 and 3, the negative electrode 2 includes a negative electrode current collector 2a and negative electrode active material-containing layers $2b_1$ and $2b_2$ formed on both surfaces of the negative electrode current collector 2a. As shown in FIG. 2, the negative electrode current collector 2a includes a portion 2c where the negative electrode active material-containing layers $2b_1$ and $2b_2$ are not formed. This portion 2c serves as a negative electrode current collector tab.

As shown in FIGS. 2 and 3, the positive electrode 3 includes a positive electrode current collector 3a and positive electrode active material-containing layers $3b_1$ and $3b_2$ formed on both surfaces of the positive electrode current collector 3a. As shown in FIG. 2, the positive electrode current collector 3a includes a portion 3c where the positive electrode active material-containing layers $3b_1$ and $3b_2$ are not formed. This portion 3c serves as a positive electrode current collector tab.

The electrode group 1 further includes two separators 4 shown in FIGS. 2 and 3. As shown in FIGS. 2 and 3, one separator 4, the negative electrode 2, the other separator 4, and the positive electrode 3 are stacked in this order. As shown in FIG. 2, the negative electrode current collector tab 2c is disposed so as not to face the positive electrode 3, and the positive electrode current collector tab 3c is disposed so as not to face the negative electrode 2. As shown in FIGS. 1 and 2, the negative electrode current collector tab 2c is disposed at one end of the electrode group 1 in a direction parallel to the winding axis w, and the positive electrode current collector tab 3c is disposed at the other end.

As shown in FIG. 3, the negative electrode 2 has a larger dimension than the positive electrode 3 in a direction T-T'. Therefore, only a part of the negative electrode active material-containing layer $2b_1$ faces the positive electrode active material-containing layer $3b_2$. In the electrode group 1 shown in FIGS. 1 to 3, a portion of the negative electrode active material-containing layer $2b_1$ that faces the positive electrode active material-containing layer $3b_2$ extends over a width C [cm] shown in FIG. 2 and a length L [cm] shown in FIG. 3. In the wound electrode group 1, a portion of the negative electrode active material-containing layer $2b_2$ that faces the positive electrode active material-containing layer $3b_1$ also extends over the width C [cm] shown in FIG. 2. However, as shown in FIG. 3, in the outermost portion (a portion indicated by s in FIG. 3) of the electrode group 1, the negative electrode active material-containing layer $2b_2$ is not formed on one of the surfaces of the negative electrode current collector 2a. Therefore, the portion of the negative electrode active material-containing layer $2b_2$ that faces the positive electrode active material-containing layer $3b_1$ extends over a length (L-s) [cm] in the direction T-T' shown in FIG. 3. That is, in the electrode group 1 shown in FIGS. 1 to 4, an area A [cm$^2$] of the portions of the negative electrode active material-containing layers $2b_1$ and $2b_2$ that face the positive electrode active material-containing layers $3b_1$ and $3b_2$ can be obtained by the following formula.

$$A[\text{cm}^2]=(L[\text{cm}]\times C[\text{cm}])+\{(L-s)[\text{cm}]\times C[\text{cm}]\}$$

Figure 4:
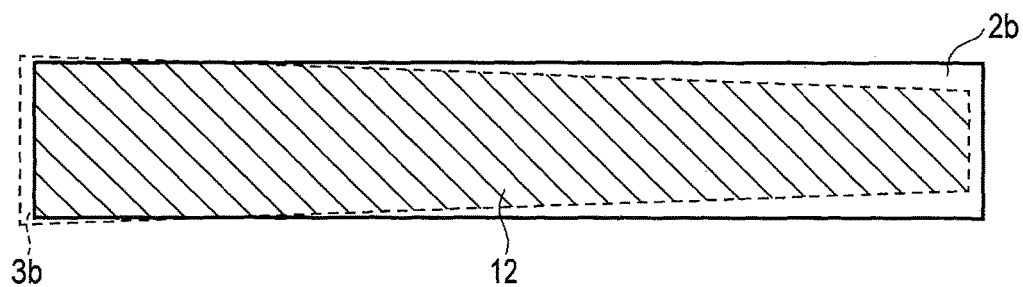
FIG. 4 is a diagram schematically showing a portion where a negative electrode active material-containing layer and a positive electrode active material-containing layer face each other in an electrode group of an example according to the embodiment.

For example, when the negative electrode active material-containing layer 2b (solid line) and the positive electrode active material-containing layer 3b (dotted line) have different shapes, as schematically shown in FIG. 4 when observed from a viewpoint V1 shown in FIG. 3, a portion of the negative electrode active material-containing layer 2b that faces the positive electrode active material-containing layer 3b is a hatched portion 12.

Next, an electrode group of another example according to the first embodiment will be described with reference to FIGS. 5 to 7.

FIG. 5 is a schematic perspective view of an electrode group of a second example according to the embodiment. FIG. 6 is a schematic cross-sectional view taken along a line VI-VI of the electrode group shown in FIG. 5. FIG. 7 is a view schematically showing a portion where the negative electrode active material-containing layer and the positive electrode active material-containing layer face each other in the electrode group shown in FIGS. 5 and 6.

Figure 7:
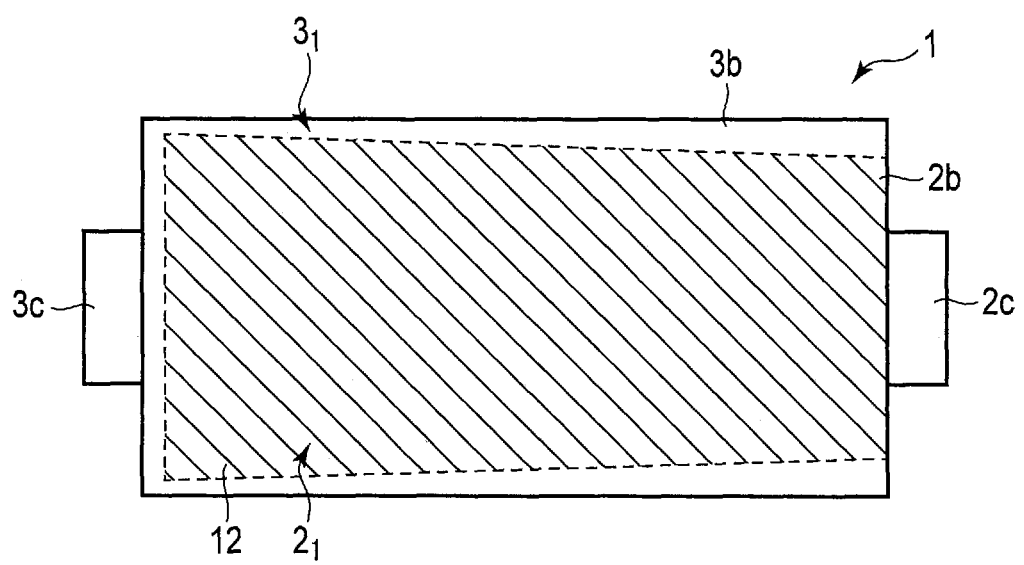
FIG. 7 is a diagram schematically showing a portion where a negative electrode active material-containing layer and a positive electrode active material-containing layer face each other in the electrode group shown in FIGS. 5 and 6.

As shown in FIG. 6, the electrode group 1 shown in FIGS. 5 to 7 has a stack-type structure. The electrode group 1 includes a plurality of (e.g., two) negative electrodes $2_1$ and $2_2$, a plurality of (e.g., two) positive electrodes $3_1$ and $3_2$, and a plurality of (e.g., five) separators 4.

One negative electrode $2_1$ includes a negative electrode current collector 2a, and negative electrode active material-containing layers 2b formed on both surfaces of the negative electrode current collector 2a. The other negative electrode $2_1$ includes a negative electrode current collector 2a, and a negative electrode active material-containing layer 2b formed on one surface of the negative electrode current collector 2a. The negative electrode current collector 2a of each of the negative electrodes $2_1$ and $2_2$ includes a portion 2c where the negative electrode active material-containing layer 2b is not formed on its surface. This portion 2c has a width smaller than that of a portion of the negative electrode current collector 2a where the negative electrode active material-containing layer 2b is formed on its surface. This portion 2c serves as a negative electrode current collector tab.

One positive electrode $3_1$ includes a positive electrode current collector 3a, and a positive electrode active material-containing layer 3b formed on one surface of the positive electrode current collector 3a. The other positive electrode $3_1$ includes a positive electrode current collector 3a, and positive electrode active material-containing layers 3b formed on both surfaces of the positive electrode current collector 3a. The positive electrode current collector 3a of each of the positive electrodes $3_1$ and $3_2$ includes a portion 3c where the positive electrode active material-containing layer 3b is not formed on its surface. This portion 3c has a width smaller than that of a portion of the positive electrode current collector 3a where the positive electrode active material-containing layer 3b is formed on its surface. This portion 3c serves as a positive electrode current collector tab.

As shown in FIG. 6, in the electrode group 1 of this example, the separator 4, negative electrode $2_2$, separator 4, positive electrode $3_2$, separator 4, negative electrode $2_1$, separator 4, positive electrode $3_1$, and separator 4 are stacked in this order from the bottom. A part of one negative electrode active material-containing layer 2b of the negative electrode $2_1$ faces the positive electrode active material-containing layer 3b of the positive electrode $3_1$ via the separator 4. A part of the other negative electrode active material-containing layer 2b of the negative electrode $2_1$ faces one positive electrode active material-containing layer 3b of the positive electrode $3_2$ via the separator 4. A part of the negative electrode active material-containing layer 2b of the negative electrode $2_2$ faces the other positive electrode active material-containing layer 3b of the positive electrode $3_2$ via the separator 4.

The negative electrode current collector tabs 2c are overlapped and connected. Similarly, the positive electrode current collector tabs 3c are overlapped and connected. As shown in FIG. 5, tips of the negative electrode current collector tabs 2c and tips of the positive electrode current collector tabs 3c face away from each other.

FIG. 7 schematically shows a portion 12 (hatched lines) where the negative electrode active material-containing layer 2b of the negative electrode $2_1$ (dotted line) and the positive electrode active material-containing layer 3b of the positive electrode $3_1$ (solid line) face each other when the electrode group 1 shown in FIGS. 5 and 6 is observed from a viewpoint V2 in FIG. 6.

In the electrode group 1 shown in FIGS. 5 to 7, an area A [cm$^2$] of the portion of the negative electrode active material-containing layer 2b that faces the positive electrode active material-containing layer 3b is a sum of an area of the portion of the negative electrode active material-containing layer 2b of the negative electrode $2_1$ that faces the positive electrode active material-containing layer 3b of the positive electrode $3_1$, an area of the portion of the negative electrode active material-containing layer 2b of the negative electrode $2_1$ that faces the positive electrode active material-containing layer 3b of the positive electrode $3_2$, and an area of the portion of the negative electrode active material-containing layer 2b of the negative electrode $2_2$ that faces the positive electrode active material-containing layer 3b of the positive electrode $3_2$. The electrode group 1 shown in FIGS. 5 to 7 has a thickness B [cm].

[Various Measurement Methods]

[Pretreatment]

First, an electrode group to be measured is prepared. When the electrode group to be measured is incorporated into a battery, the electrode group to be measured is taken out by the following procedure. First, the battery including the electrode group to be measured is prepared. The battery is subjected to constant current discharge at a current value [A] of about 0.2 C until a battery voltage reaches 1.5 V, in a thermostatic chamber at 25° C. The battery is then subjected to constant voltage discharge at 1.5 V for 1 hour. After the constant voltage discharge, the battery is placed in an argon glove box and disassembled. In the glove box, the electrode group is taken out from a container member. At this time, attention is paid to an electrode terminal and/or an electrode lead so that the positive electrode active material-containing layer and the negative electrode active material-containing layer are not damaged. The electrode group taken out is immersed in ethyl methyl carbonate for 10 minutes. The electrode group is then removed from the ethyl methyl carbonate and dried. In this way, the electrode group to be measured can be obtained.

[Measurement of Area A]

In the case of a wound-type electrode group, the winding of the electrode group is released while being careful not to damage the positive electrode active material-containing layer and the negative electrode active material-containing layer. In the developed electrode group (laminate), an area of a portion where the negative electrode active material-containing layer and the positive electrode active material-containing layer overlap each other is measured. Care is taken not to damage the positive electrode active material-containing layer and the negative electrode active material-containing layer even when the positive electrode, negative electrode, and/or separator are peeled from the laminate. An area of a portion of the negative electrode active material-containing layer that faces the positive electrode active material-containing layer in the wound state is also measured.

In the case of an electrode group having a stack-type structure, an area of a portion where the negative electrode active material-containing layer and the positive electrode active material-containing layer overlap each other is measured in the electrode group taken out as in the above-described manner. When the positive electrode, negative electrode, and/or separator are peeled from the laminate, care is taken not to damage the positive electrode active material-containing layer and the negative electrode active material-containing layer.

A length of the overlapping portion of the negative electrode active material-containing layer and the positive electrode active material-containing layer is measured by using a measuring means such as a ruler or a tape measure according to the length.

The area A is a macroscopic area of a portion of the negative electrode active material-containing layer that faces the positive electrode active material-containing layer, and does not include, for example, an area of pores of the negative electrode active material-containing layer.

[Measurement of Thickness B]

A thickness B of an electrode group is a thickness measured by applying a load of from 15 g to 20 g per 1 cm$^2$ to a surface having the largest area among surfaces of the electrode group. When the thickness is measured, a measuring apparatus having a function of applying such a load and a function of measuring the length in a state of applying such a load is used.

[Cross-Sectional SEM Observation]

The electrode group to be measured is subjected to cross-sectional polish using an ion beam milling instrument. The obtained cross section is observed with a scanning electron microscope equipped with an energy dispersive X-ray analyzer (SEM-EDX). Through this observation, it is possible to know compositions (elements B to U in the periodic table) of components contained in each of the positive electrode active material-containing layer and the negative electrode active material-containing layer.

[Identification of Active Material]

A composition and a crystal structure in an active material can be identified by combining a result of an elemental analysis by the above-described SEM-EDX, a result of an inductively coupled plasma (ICP) emission analysis to be described below, and a result of a powder X-ray diffraction (XRD) analysis to be described below.

[Elemental Analysis by SEM-EDX]

According to the elemental analysis by the above-described SEM-EDX, a composition of the elements B to U in the periodic table among the elements contained in the active material can be known.

[Elemental Analysis by ICP]

An electrode containing an active material to be measured is taken out from the electrode group. Next, a part of the electrode taken out is put into an appropriate solvent and irradiated with ultrasonic waves. For example, an active material-containing layer containing the active material can be peeled from a current collector by placing the electrode in ethyl methyl carbonate in a glass beaker and vibrating the electrode in an ultrasonic cleaner. Next, reduced-pressure drying is performed to dry the peeled active material-containing layer. The obtained active material-containing layer is pulverized with a mortar, etc. to obtain a powder containing the active material to be measured, an electro-conductive agent, a binder, etc. A liquid sample containing the active material can be prepared by dissolving the powder in an acid. Examples of the acid include hydrochloric acid, nitric acid, sulfuric acid, and hydrogen fluoride. A concentration of a metal element (including Li) in the active material can be determined by subjecting the liquid sample to ICP emission spectrometry.

[Identification of Composition of Active Material Particles]

Based on the elemental analysis result by the SEM-EDX and the ICP emission spectrometry result, the composition of the active material can be identified. When there are a plurality of kinds of active materials, a mass ratio is estimated from a content ratio of an element specific to each active material. The ratio of the specific element to the mass of the active material can be determined from the composition of the constituent elements determined by the EDX.

[Identification of Crystal Structure]

A crystal structure of an active material can be specified by X-ray diffraction (XRD) measurement.

The measurement is performed in a measurement range of 2θ=10° to 90° using a CuKα ray as a radiation source. Through this measurement, an X-ray diffraction pattern of an active material particle can be obtained.

As an apparatus for the powder X-ray diffraction measurement, SmartLab manufactured by Rigaku Corporation is used. Measurement conditions are as follows: Cu target: 45 kV 200 mA; Soller slit: 5° for both incidence and reception; step width: 0.02 deg; scan speed: 20 deg/min; semiconductor detector: D/teX Ultra 250; sample plate holder: flat glass sample plate holder (0.5 mm thick); and measurement range: 10°≤2θ≤90°. When another apparatus is used, measurement is performed using a standard Si powder for powder X-ray diffraction to find conditions under which measurement results of peak intensity, half width, and diffraction angle equivalent to the results obtained by the above-described apparatus are obtained, and the sample is measured under these conditions.

The XRD measurement of the electrode can be performed by cutting out the electrode to be measured to the same extent as an area of a holder of a wide-angle X-ray diffractometer, and directly attaching the electrode to a glass holder to perform the measurement. At this time, an XRD of the current collector is measured, and a position at which a peak derived from the current collector appears is grasped. The presence or absence of a peak of a mixture such as an electro-conductive agent and a binder is also grasped in advance. In the case where the peak of the current collector and a peak of the active material overlap each other, it is desirable to perform the measurement after the active material-containing layer is peeled off from the current collector. This is for separating overlapping peaks when quantitatively measuring the peak intensity. If these are already grasped in advance, this operation can be omitted. Although the active material-containing layer may be physically peeled off, it is easily peeled off by applying ultrasonic waves in a solvent. By measuring the active material-containing layer thus recovered, wide-angle X-ray diffraction measurement of the active material can be performed.

Through the above procedure, the XRD pattern of the active material can be obtained. The crystal structure of the active material can be identified from the obtained XRD pattern.

According to the first embodiment, an electrode group is provided. This electrode group includes a positive electrode including a positive electrode active material-containing layer and a negative electrode including a negative electrode active material-containing layer. The negative electrode active material-containing layer contains at least one titanium-containing composite oxide selected from the group consisting of a monoclinic niobium titanium composite oxide and an orthorhombic titanium-containing composite oxide. At least a part of the negative electrode active material-containing layer faces at least a part of the positive electrode active material-containing layer. This electrode group satisfies the formula: $6500 \leq A/B \leq 18500$. The electrode group can sufficiently suppress heat generation from the electrode group and sufficiently dissipate heat from the electrode group. In addition, the electrode group can sufficiently suppress an increase in a resistance value even when a large voltage is applied. The electrode group can generate heat sufficient to enhance a rapid charging performance of a battery during charging in a low-temperature environment. As a result, the electrode group according to the first embodiment can realize a battery that can exhibit an excellent cycle life and an excellent rapid charging performance in a low-temperature environment.

Second Embodiment

According to a second embodiment, a battery is provided. This battery includes an electrode group according to the first embodiment, and an electrolyte.

Since the battery according to the second embodiment includes the electrode group according to the first embodiment, the battery can exhibit an excellent cycle life and an excellent rapid charging performance in a low-temperature environment.

The battery according to the second embodiment can be repeatedly charged and discharged. Therefore, the battery according to the second embodiment can also be referred to as a secondary battery.

The battery according to the second embodiment is, for example, a nonaqueous electrolyte battery. The nonaqueous electrolyte battery includes a nonaqueous electrolyte, and the nonaqueous electrolyte includes an electrolyte. Alternatively, the battery according to the second embodiment may be a battery containing an electrolyte solution containing an aqueous solvent and an electrolyte dissolved in the aqueous solvent.

Next, the battery according to the second embodiment will be described in more detail.

In the nonaqueous electrolyte battery, which is an example of the battery according to the second embodiment, a nonaqueous electrolyte may be held, for example, in a state in which the electrode group is impregnated with the nonaqueous electrolyte. Alternatively, in a battery of another example according to the second embodiment, an electrolyte solution containing an electrolyte may be held, for example, in a state in which the electrode group is impregnated with the electrolyte solution.

The battery according to the second embodiment can further include a negative electrode terminal and a positive electrode terminal. A part of the negative electrode terminal is electrically connected to a part of a negative electrode so that the negative electrode terminal can serve as a conductor for electrons to move between the negative electrode and an external terminal. The negative electrode terminal can be connected to, for example, a negative electrode current collector, particularly a negative electrode current collector tab. Similarly, a part of the positive electrode terminal is electrically connected to a part of a positive electrode so that the positive electrode terminal can serve as a conductor for electrons to move between the positive electrode and an external circuit. The positive electrode terminal can be connected to, for example, a positive electrode current collector, particularly a positive electrode current collector tab.

The battery according to the second embodiment can further include a container member. The container member can accommodate the electrode group and the electrolyte. In the case of the nonaqueous electrolyte battery, the electrode group may be impregnated with the nonaqueous electrolyte within the container member. A part of each of the positive electrode terminal and the negative electrode terminal can be extended from the container member.

A rated capacity of the battery according to the second embodiment is preferably from 25 Ah to 150 Ah, and more preferably from 30 Ah to 100 Ah. The rated capacity of the battery is measured by the following procedure. First, the battery to be measured is charged up to 3.2 V at a constant current of 5 A in a 25° C. environment. The battery is then discharged at a low voltage of 3.2 V for 1 hour. After that, the battery is left in an open circuit state for 30 minutes. Next, the battery is discharged down to 1.5 V at a constant current of 5 A. The capacity obtained by this discharge is defined as a rated capacity [Ah].

Next, each member that can be included in the nonaqueous electrolyte battery, which is an example of the battery according to the second embodiment, will be described in more detail.

(Electrode Group)

The electrode group included in the battery according to the second embodiment is the electrode group according to the first embodiment.

(Nonaqueous Electrolyte)

As the nonaqueous electrolyte, for example, a liquid nonaqueous electrolyte or a gel nonaqueous electrolyte can be used.

The liquid nonaqueous electrolyte can be prepared by dissolving an electrolyte in an organic solvent. The concentration of the electrolyte is preferably in a range of from 0.5 mol/l to 2.5 mol/l. The gel nonaqueous electrolyte is prepared by combining a liquid electrolyte and a polymer material.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoride arsenate ($LiAsF_6$), lithium trifluoromethanesulfonate ($LiCF_3SO_3$), and lithium bistrifluoromethylsulfonylimide [$LiN(CF_3SO_2)_2$]. As the electrolyte, one of these electrolytes may be used alone, or two or more electrolytes may be used in combination. The electrolyte preferably includes $LiPF_6$.

Examples of the organic solvent include cyclic carbonates such as propylene carbonate (PC), ethylene carbonate (EC), and vinylene carbonate; chain carbonates such as diethyl carbonate (DEC), dimethyl carbonate (DMC), and methyl ethyl carbonate (MEC); cyclic ethers such as tetrahydrofuran (THF), 2-methyltetrahydrofuran (2MeTHF), and dioxolane (DOX); chain ethers such as dimethoxyethane (DME) and diethoxyethane (DEE); acetonitrile (AN), and sulfolane (SL). As the organic solvent, one of these solvents may be used alone, or two or more solvents may be used in combination.

More preferred examples of the organic solvent include a mixed solvent obtained by mixing two or more selected from the group consisting of propylene carbonate (PC), ethylene carbonate (EC), diethyl carbonate (DEC), dimethyl carbonate (DMC), and methyl ethyl carbonate (MEC). By using such a mixed solvent, a nonaqueous electrolyte battery having excellent charge-and-discharge cycle characteristics can be obtained. An additive can be added to the electrolyte solution.

(Container Member)

As the container member, for example, a bag-shaped container made of a laminate film or a metal container can be used.

The shape of the container member is not particularly limited, and examples thereof include flat, square, cylindrical, coin-shaped, button-shaped, sheet-shaped, and stacked. Of course, the container member may be of a compact battery mounted on mobile electronic devices, or a large battery mounted on vehicles such as two- to four-wheel automobiles.

As the laminate film, for example, a multilayer film in which a metal layer is sandwiched between resin films can be used. Alternatively, a multilayer film including a metal layer and a resin layer covering the metal layer can be used.

The metal layer is preferably made of an aluminum foil or an aluminum alloy foil, so as to reduce weight. As the resin film, for example, a polymer material such as polypropylene (PP), polyethylene (PE), nylon, or polyethylene terephthalate (PET) can be used. The laminate film can be formed into the shape of a container member by heat-sealing. A wall thickness of the laminate film is preferably 0.2 mm or less.

The metal container can be formed of aluminum or an aluminum alloy. The aluminum alloy preferably includes an element such as magnesium, zinc, or silicon. On the other hand, an amount of a transition metal such as iron, copper, nickel, or chromium included in the alloy is preferably 100 ppm or less. Thereby, a long-term reliability and a heat dissipating ability in a high-temperature environment can be increased greatly. A wall thickness of the metal container is preferably 0.5 mm or less, more preferably 0.2 mm or less.

(Positive Electrode Terminal)

The positive electrode terminal is formed of, for example, a material that is electrically stable and conductive when a potential with respect to an oxidation-reduction potential of lithium is in a range of from 3.0 V to 4.5 V. The positive electrode terminal is preferably made of aluminum or an aluminum alloy containing an element such as Mg, Ti, Zn, Mn, Fe, Cu, or Si. The positive electrode terminal is preferably formed of the same material as that of the positive electrode current collector in order to reduce contact resistance with the positive electrode current collector.

(Negative Electrode Terminal)

The negative electrode terminal is formed of a material that is electrically stable and conductive when a potential with respect to an oxidation-reduction potential of lithium is in a range of from 0.8 V to 3.0 V. The negative electrode terminal is preferably made of aluminum or an aluminum alloy containing an element such as Mg, Ti, Zn, Mn, Fe, Cu, or Si. The negative electrode terminal is preferably made of the same material as that of the negative electrode current collector in order to reduce contact resistance with the negative electrode current collector.

Next, several examples of the nonaqueous electrolyte battery according to the second embodiment will be specifically described with reference to the drawings.

Figure 8:
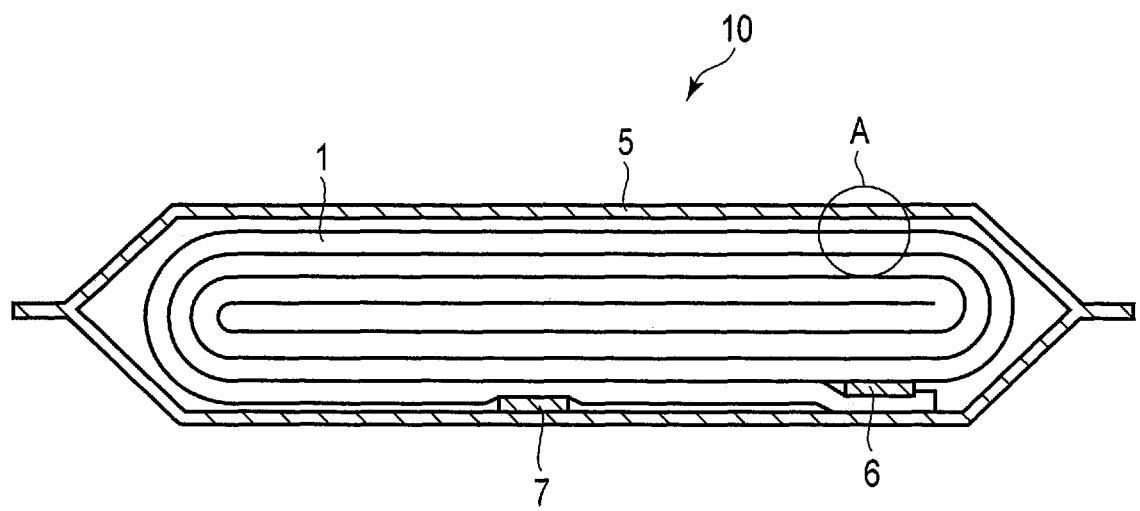
FIG. 8 is a schematic cross-sectional view of a nonaqueous electrolyte battery of the first example according to the embodiment.
Figure 9:
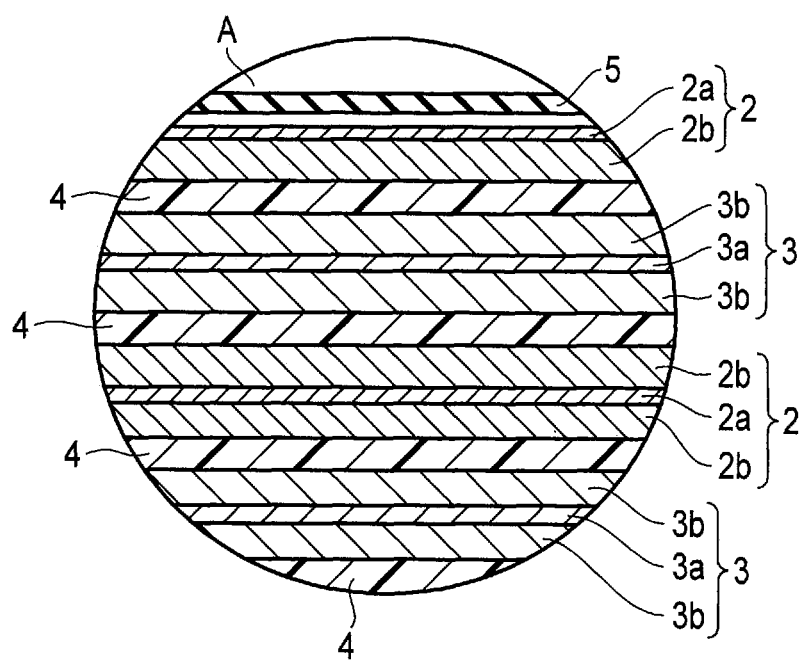
FIG. 9 is an enlarged cross-sectional view of a portion A of the nonaqueous electrolyte battery shown in FIG. 8.

FIG. 8 is a schematic cross-sectional view of a flat nonaqueous electrolyte battery, which is an example according to the second embodiment. FIG. 9 is an enlarged cross-sectional view of a portion A in FIG. 8.

A nonaqueous electrolyte battery 10 shown in FIGS. 8 and 9 includes a flat wound-type electrode group 1 shown in FIG. 8. The flat wound electrode group 1 is housed in a bag-shaped container member 5 made of a laminate film. The laminate film includes a metal layer and two resin films sandwiching the metal layer.

As shown in FIG. 9, the flat wound electrode group 1 is formed by spirally winding a laminate in which the negative electrode 2, separator 4, positive electrode 3, and separator 4 are laminated in this order from the outside and press-molding the laminate. In the outermost portion of the negative electrode 2, the negative electrode active material-containing layer 2b is formed on one inner surface of the negative electrode current collector 2a as shown in FIG. 9. In the other portions of the negative electrode 2, the negative electrode active material-containing layer 2b is formed on both surfaces of the negative electrode current collector 2a. In the positive electrode 3, the positive electrode active material-containing layer 3b is formed on both surfaces of the positive electrode current collector 3a.

In the vicinity of the outer peripheral end of the wound-type electrode group 1, a negative electrode terminal 7 is connected to the negative electrode current collector 2a of the outermost layer of the negative electrode 2, and a positive electrode terminal 6 is connected to the positive electrode current collector 3a of the positive electrode 3 located on the inner side. These negative electrode terminal 7 and positive electrode terminal 6 extend to the outside from an opening of the bag-shaped container member 5.

The nonaqueous electrolyte battery 10 shown in FIGS. 8 and 9 further includes a nonaqueous electrolyte (not shown). The nonaqueous electrolyte is housed in the container member 5 in a state in which the electrode group 1 is impregnated with the nonaqueous electrolyte.

The nonaqueous electrolyte can be injected, for example, from the opening of the bag-shaped container member 5. After the nonaqueous electrolyte is injected, the opening of the bag-shaped container member 5 is heat-sealed with the negative electrode terminal 7 and the positive electrode terminal 6 interposed therebetween so that the wound-type electrode group 1 and the nonaqueous electrolyte can be completely sealed.

The electrode group 1 shown in FIG. 8 is an example of the electrode group according to the first embodiment.

Figure 10:
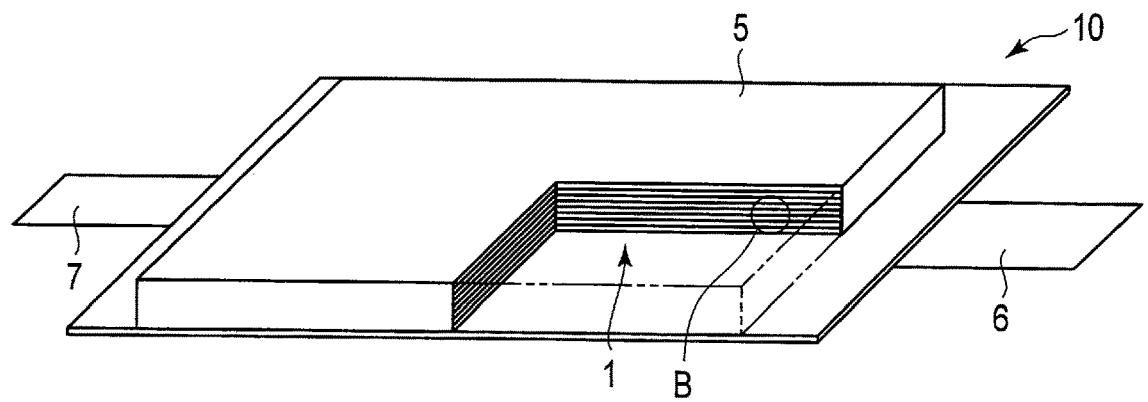
FIG. 10 is a partially cutaway schematic perspective view of a nonaqueous electrolyte battery of a second example according to the embodiment.
Figure 11:
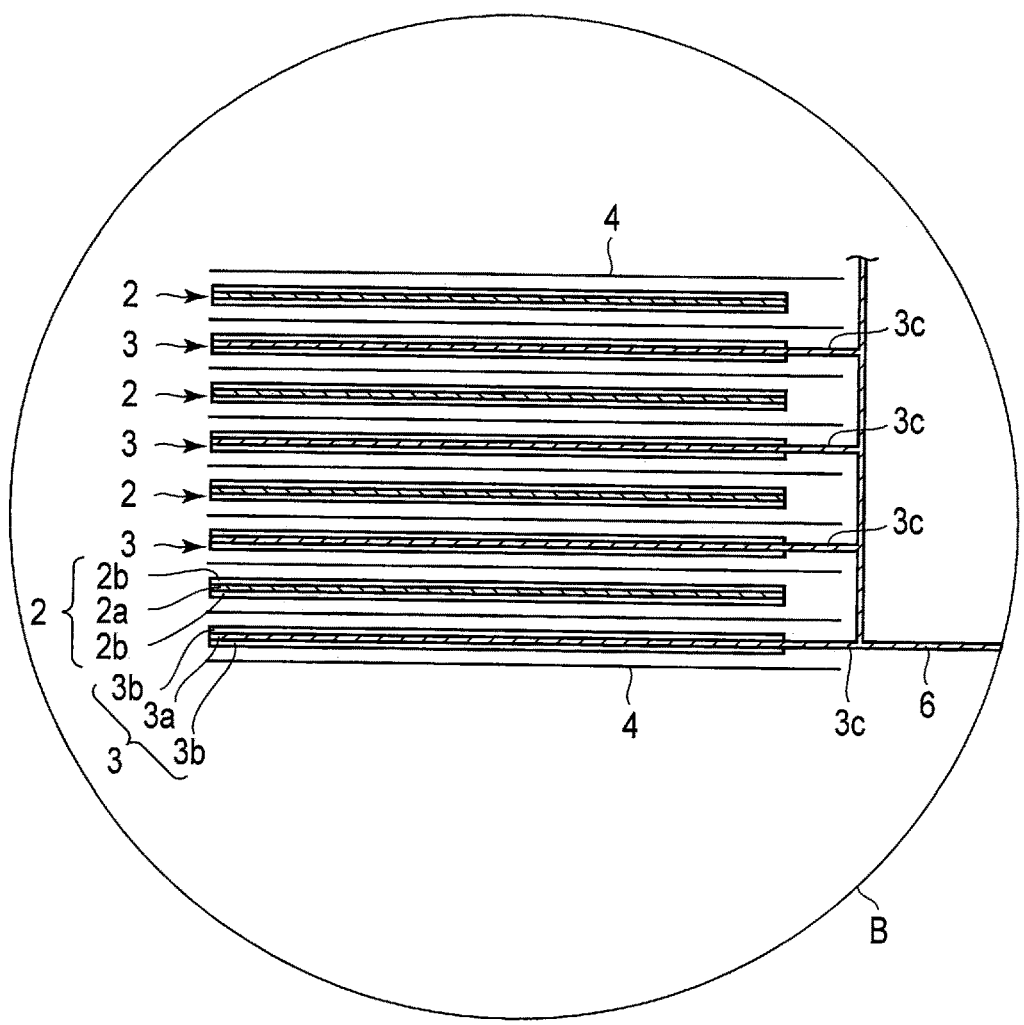
FIG. 11 is an enlarged cross-sectional view of a portion B of the nonaqueous electrolyte battery shown in FIG. 10.

The nonaqueous electrolyte battery according to the second embodiment is not limited to the above-described configuration shown in FIGS. 8 and 9, and may have a configuration shown in FIGS. 10 and 11, for example.

FIG. 10 is a schematic partially cutaway perspective view of a nonaqueous electrolyte battery of another example according to the second embodiment. FIG. 11 is an enlarged cross-sectional view of a portion B in FIG. 10.

The nonaqueous electrolyte battery 10 shown in FIGS. 10 and 11 includes a stack-type electrode group 1. The stack-type electrode group 1 is housed in a container member 5 made of a laminate film. The laminate film includes a metal layer and two resin films sandwiching the metal layer.

As shown in FIG. 11, the stack-type electrode group 1 has a structure in which the positive electrode 3 and the negative electrode 2 are alternately stacked with the separator 4 interposed therebetween. There are a plurality of positive electrodes 3, each of which includes the current collector 3a and the positive electrode active material-containing layers 3b formed on both surfaces of the current collector 3a. There are a plurality of negative electrodes 2, each of which includes the negative electrode current collector 2a and the negative electrode active material-containing layers 2b formed on both surfaces of the negative electrode current collector 2a. Although not shown in the figure, one side of the negative electrode current collector 2a of each negative electrode 2 protrudes from the positive electrode 3. A portion of the negative electrode current collector 2a protruding from the positive electrode 3 is electrically connected to the belt-like negative electrode terminal 7. A tip of the belt-like negative electrode terminal 7 is drawn out from the container member 5 to the outside. A side of the positive electrode current collector 3a of the positive electrode 3 located on the opposite side of the protruding side of the negative electrode current collector 2a protrudes from the negative electrode 2. A portion 3c of the positive electrode current collector 3a that protrudes from the negative electrode 2 is electrically connected to a belt-like positive electrode terminal 6. A tip of the belt-like positive electrode terminal 6 is located on a side opposite to the negative electrode terminal 7 and is drawn out from a side of the container member 5 to the outside.

The electrode group 1 shown in FIGS. 10 and 11 is an example of the electrode group according to the first embodiment.

Since the battery according to the second embodiment includes the electrode group according to the first embodiment, the battery can exhibit an excellent cycle life and an excellent rapid charging performance in a low-temperature environment.

Third Embodiment

According to a third embodiment, a battery pack is provided. This battery pack includes the battery according to the second embodiment.

The battery pack according to the third embodiment can include a plurality of batteries. The plurality of batteries can be electrically connected in series or electrically connected in parallel. Alternatively, a plurality of batteries can be connected by a combination of series connection and parallel connection.

For example, the battery pack according to the third embodiment can include five batteries according to the second embodiment. These batteries can be connected in series. The batteries connected in series can constitute a battery module. That is, the battery pack according to the third embodiment can include a battery module.

The battery pack according to the third embodiment can include a plurality of battery modules. The plurality of battery modules can be connected in series, in parallel, or by a combination of series connection and parallel connection.

The battery pack according to the third embodiment will be described in detail with reference to FIGS. 12 and 13. The flat-type battery shown in FIGS. 8 and 9 can be used as a single-battery.

A plurality of single-batteries 21 constituted by the flat-type nonaqueous electrolyte batteries shown in FIGS. 8 and 9 are stacked so that the negative electrode terminal 7 and the positive electrode terminal 6 extending to the outside are aligned in the same direction, and are fastened by an adhesive tape 22 to constitute a battery module 23. As shown in FIG. 13, these single-batteries 21 are electrically connected to each other in series.

A printed wiring board 24 is disposed to face the side surface of the single-batteries 21, from which the negative electrode terminal 7 and the positive electrode terminal 6 protrude. As shown in FIG. 13, a thermistor 25, a protective circuit 26, and a conducting terminal 27 that conducts electricity to an external device are mounted on the printed wiring board 24. An electric insulating plate (not shown) is attached to the surface of the printed wiring board 24 that faces the battery module 23 to avoid unnecessary connection with wires of the battery module 23.

A positive electrode-side lead 28 is connected to the positive electrode terminal 6 located in the lowermost layer of the battery module 23, and a tip thereof is inserted into and electrically connected to a positive electrode-side connector 29 of the printed wiring board 24. A negative electrode-side lead 30 is connected to the negative electrode terminal 7 located in the uppermost layer of the battery module 23, and a tip thereof is inserted into and electrically connected to a negative electrode-side connector 31 of the printed wiring board 24. These connectors 29 and 31 are connected to the protective circuit 26 through wires 32 and 33 formed on the printed wiring board 24.

The thermistor 25 detects the temperature of the single-batteries 21, and a detection signal thereof is sent to the protective circuit 26. The protective circuit 26 can disconnect a plus-side wire 34a and a minus-side wire 34b, which connect between the protective circuit 26 and the conducting terminal 27 for an external device, under a predetermined condition. The predetermined condition is, for example, when the temperature detected by the thermistor 25 rises to a predetermined temperature or higher. Also, the predetermined condition is when overcharge, overdischarge, overcurrent, etc. of the single-batteries 21 is detected. The detection of the overcharge, etc. is performed for each individual single-battery 21 or the entire battery module 23. When detecting the overcharge, etc. for each individual single-battery 21, a battery voltage may be detected, or a positive electrode potential or negative electrode potential may be detected. In the latter case, a lithium electrode used as a reference electrode is inserted into each individual single-battery 21. In the case of FIGS. 12 and 13, a wire 35 for voltage detection is connected to each of the single-batteries 21, and detection signals are transmitted to the protective circuit 26 through these wires 35.

A protective sheet 36 made of rubber or resin is disposed on each of three side surfaces of the battery module 23, excluding the side surface from which the positive electrode terminal 6 and the negative electrode terminal 7 protrude.

The battery module 23 is housed in a housing container 37 together with the protective sheets 36 and the printed wiring board 24. That is, the protective sheets 36 are respectively disposed on both inner side surfaces in the long-side direction and one inner side surface in the short-side direction of the housing container 37, and the printed wiring board 24 is disposed on the other inner side surface in the short-side direction. The battery module 23 is located in a space surrounded by the protective sheets 36 and the printed wiring board 24. A lid 38 is attached to the top surface of the housing container 37.

In order to fix the battery module 23, a heat-shrinkable tape may be used in place of the adhesive tape 22. In this case, the protective sheets are disposed on both side surfaces of the battery module, the heat-shrinkable tape is wound around the battery module and the protective sheets, and then the heat-shrinkable tape is thermally shrunk to bind the battery module.

Figure 12:
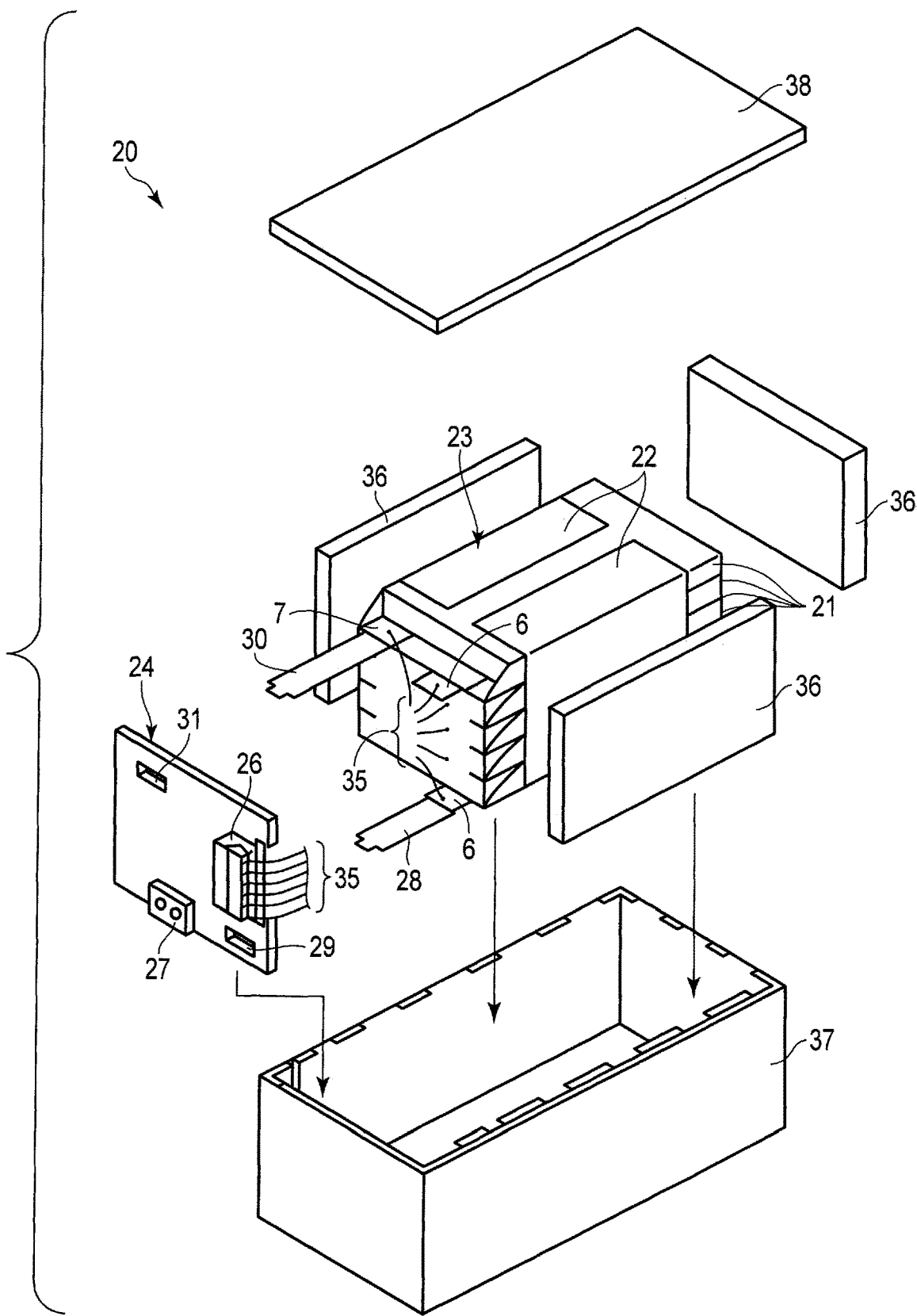
FIG. 12 is a schematic exploded perspective view of a battery pack of an example according to the embodiment.

In FIGS. 12 and 13, the single-batteries 21 are connected in series, but may be connected in parallel to increase the battery capacity. Assembled battery packs can be connected in series and/or in parallel.

The battery pack according to the third embodiment can include various forms of the batteries according to the first embodiment.

The form of the battery pack according to the third embodiment is appropriately changed depending on usage. The battery pack according to the third embodiment is suitable for use where excellent cycle characteristics are required when a large current is extracted. Specifically, the battery pack is used as a power supply for a digital camera, or as an in-vehicle battery of a vehicle such as a train, a two- to four-wheel hybrid electric automobile, a two- to four-wheel electric automobile, and an electric assist bicycle. In particular, it is suitably used as an in-vehicle battery.

Since the battery pack according to the third embodiment includes the battery according to the second embodiment, the battery pack can exhibit an excellent cycle life and an excellent rapid charging performance in a low-temperature environment.

EXAMPLES

Examples will be described below, but the present invention is not limited to the examples described below as long as the present invention does not deviate from the scope and spirit thereof.

Example 1

In Example 1, an electrode group was produced by the following procedure.

[Production of Negative Electrode]

Particles of a monoclinic niobium titanium composite oxide having a composition represented by the formula $TiNb_2O_7$ were prepared as a negative electrode active material. The particles had an average particle diameter of 15 μm and had a secondary particle shape with carbon attached to a surface thereof. In addition, acetylene black as an electro-conductive agent and polyvinylidene fluoride (PVdF) as a binder were prepared. These were mixed in N-methylpyrrolidone so that a mass ratio of negative electrode active material electro-conductive agent binder was 80:10:10 to obtain a slurry. This slurry was applied to both surfaces of a current collector of aluminum foil having a thickness of 12 μm, and coating films were dried. In this manner, a composite including the current collector and negative electrode active material-containing layers formed on both surfaces of the current collector was obtained. The obtained composite was then subjected to roll pressing so as to have a thickness of 119.6 μm. Next, this composite was further subjected to vacuum drying. Subsequently, the composite was cut so that a coating width of the negative electrode active material-containing layer was 190 mm. In this manner, a negative electrode was obtained.

[Production of Positive Electrode]

Particles of a lithium nickel cobalt manganese composite oxide represented by the formula $LiNi_{0.5}Co_{0.2}Mn_{0.3}O_2$ were prepared as a positive electrode active material. In addition, acetylene black as an electro-conductive agent and polyvinylidene fluoride (PVdF) as a binder were prepared. These were mixed so that a mass ratio of positive electrode active material:electro-conductive agent:binder was 90:5:5 to obtain a mixture. Next, the obtained mixture was dispersed in an n-methylpyrrolidone (NMP) solvent to prepare a positive electrode slurry. This slurry was applied to both surfaces of a current collector of aluminum foil having a thickness of 15 μm, and coating films were dried. In this manner, a composite including the current collector and positive electrode active material-containing layers formed on both surfaces of the current collector was obtained. The obtained composite was then subjected to roll pressing so as to have a thickness of 117.9 μm. Next, the composite was cut so that a coating width of the positive electrode active material-containing layer was 189 mm. In this manner, a positive electrode was obtained.

[Assembly of Battery]

Two separators made of cellulose fiber non-woven fabric having a thickness of 10 μm were prepared. Next, the negative electrode, separator, positive electrode, and separator were stacked in this order to obtain a laminate. The laminate was then spirally wound so that a part of the negative electrode was located on the outermost side to obtain a wound body. Subsequently, the wound body was pressed. In this manner, an electrode group was produced. The number of windings and a pressing pressure were adjusted such that the thickness B of the obtained electrode group was 1.67 cm. This electrode group was inserted into a container made of a laminate film.

Meanwhile, a nonaqueous electrolyte was prepared by the following procedure. First, propylene carbonate (PC) and diethyl carbonate (DEC) were mixed at a volume ratio PC:DEC of 1:2 to obtain a mixed solvent. Lithium hexafluorophosphate $LiPF_6$ was dissolved in the mixed solvent at a concentration of 1M to obtain a liquid nonaqueous electrolyte.

The prepared liquid nonaqueous electrolyte was injected into a container. In this manner, the electrode group held the nonaqueous electrolyte. Then, the container was sealed to obtain a nonaqueous electrolyte battery having a thickness of 17 mm, a width of 88 mm, and a height of 240 mm.

Example 2

In Example 2, a nonaqueous electrolyte battery was produced in the same manner as in Example 1 except for the following points.

In the production of the negative electrode, roll pressing was performed so that the thickness of the composite was 91.3 μm. In the production of the positive electrode, roll pressing was performed so that the thickness of the composite was 96.4 μm. Pressing was performed. In the production of the electrode group, the number of windings and the pressing pressure were adjusted so that the thickness B of the obtained electrode group was 1.67 cm. Specifically, in Example 2, the number of windings was increased as compared with Example 1.

The battery of Example 2 was a nonaqueous electrolyte battery having a thickness of 17 mm, a width of 88 mm, and a height of 240 mm.

Example 3

In Example 3, a nonaqueous electrolyte battery was produced in the same manner as in Example 1 except for the following points.

In the production of the negative electrode, roll pressing was performed so that the thickness of the composite was 91.3 μm. The composite was cut so that the coating width of the negative electrode active material-containing layer was 93 mm so as to obtain the negative electrode. In the production of the positive electrode, roll pressing was performed so that the thickness of the composite was 96.4 μm. In addition, the composite was cut so that the coating width of the positive electrode active material-containing layer was 92 mm so as to obtain the positive electrode. In the production of the electrode group, the number of windings and the pressing pressure were adjusted so that the thickness B of the obtained electrode group was 2.0 cm. The obtained electrode group was housed in an aluminum container.

The battery of Example 3 was a prismatic nonaqueous electrolyte battery having a thickness of 21 mm, a width of 115 mm, and a height of 105 mm.

Example 4

In Example 4, a nonaqueous electrolyte battery was produced in the same manner as in Example 3 except for the following points.

In the production of the electrode group, two separators made of cellulose fiber non-woven fabric having a thickness of 20 μm were prepared as the separators. The number of windings and the pressing pressure were adjusted so that the thickness B of the obtained electrode group was 2.0 cm.

The battery of Example 4 was a prismatic nonaqueous electrolyte battery having a thickness of 21 mm, a width of 115 mm, and a height of 105 mm.

Example 5

In Example 5, a nonaqueous electrolyte battery was produced in the same manner as in Example 1 except for the following points.

In the production of the negative electrode, roll pressing was performed so that the thickness of the composite was 111.5 μm. In the production of the positive electrode, roll pressing was performed so that the thickness of the composite was 126.3 μm. Pressing was performed. In the production of the electrode group, the number of windings and the pressing pressure were adjusted so that the thickness B of the obtained electrode group was 3.47 cm.

The battery of Example 5 was a nonaqueous electrolyte battery having a thickness of 35 mm, a width of 88 mm, and a height of 240 mm.

Example 6

In Example 6, a nonaqueous electrolyte battery was produced in the same manner as in Example 1 except for the following points.

In the production of the negative electrode, roll pressing was performed so that the thickness of the composite was 91.3 μm. The composite was cut so that the coating width of the negative electrode active material-containing layer was 190 mm so as to obtain the negative electrode. In the production of the positive electrode, roll pressing was performed so that the thickness of the composite was 96.4 μm. In addition, the composite was cut so that the coating width of the positive electrode active material-containing layer was 189 mm so as to obtain the positive electrode. In the production of the electrode group, the number of windings and the pressing pressure were adjusted so that the thickness B of the obtained electrode group was 4.27 cm.

The battery of Example 6 was a nonaqueous electrolyte battery having a thickness of 43 mm, a width of 88 mm, and a height of 240 mm.

Comparative Example 1

In Comparative Example 1, a nonaqueous electrolyte battery was produced in the same manner as in Example 1 except for the following points.

In the production of the negative electrode, roll pressing was performed so that the thickness of the composite was 64.5 μm. The composite was cut so that the coating width of the negative electrode active material-containing layer was 190 mm so as to obtain the negative electrode. Furthermore, in the production of the positive electrode, roll pressing was performed so that the thickness of the composite was 69.0 μm. In addition, the composite was cut so that the coating width of the positive electrode active material-containing layer was 189 mm so as to obtain the positive electrode. In the production of the electrode group, the number of windings and the pressing pressure were adjusted so that the thickness B of the obtained electrode group was 1.67 cm.

The battery of Comparative Example 1 was a nonaqueous electrolyte battery having a thickness of 17 mm, a width of 88 mm, and a height of 240 mm.

Comparative Example 2

In Comparative Example 2, a nonaqueous electrolyte battery was produced in the same manner as in Example 1 except for the following points.

In the production of the negative electrode, roll pressing was performed so that the thickness of the composite was 121.6 μm. The composite was cut so that the coating width of the negative electrode active material-containing layer was 93 mm so as to obtain the negative electrode. Furthermore, in the production of the positive electrode, roll pressing was performed so that the thickness of the composite was 131.9 μm. In addition, the composite was cut so that the coating width of the positive electrode active material-containing layer was 92 mm so as to obtain the positive electrode. In the production of the electrode group, the number of windings and the pressing pressure were adjusted so that the thickness B of the obtained electrode group was 2.0 cm. The obtained electrode group was housed in an aluminum container.

The battery of Comparative Example 2 was a prismatic nonaqueous electrolyte battery having a thickness of 21 mm, a width of 115 mm, and a height of 105 mm.

Comparative Example 3

In Comparative Example 3, an electrode group was produced by the following procedure.

[Production of Negative Electrode]

Particles having a composition represented by the formula $Li_4Ti_5O_{12}$ were prepared as a negative electrode active material. The particles were in the form of primary particles having an average particle size of 2 μm. In addition, acetylene black as an electro-conductive agent and polyvinylidene fluoride (PVdF) as a binder were prepared. These were mixed in N-methylpyrrolidone so that a mass ratio of negative electrode active material:electro-conductive agent: binder was 80:10:10 to obtain a slurry. This slurry was applied to both surfaces of a current collector of aluminum foil having a thickness of 15 μm, and coating films were dried. In this manner, a composite including the current collector and negative electrode active material-containing layers formed on both surfaces of the current collector was obtained. Next, the obtained composite was subjected to roll pressing so as to have a thickness of 130.4 μm. This composite was then further subjected to vacuum drying. Subsequently, the composite was cut so that the coating width of the negative electrode active material-containing layer was 185 mm. In this manner, a negative electrode was obtained.

[Production of Positive Electrode]

A positive electrode was produced in the same manner as in Example 1 except for the following points.

Roll pressing was performed so that the thickness of the composite was 96.0 μm. In addition, the composite was cut so that the coating width of the positive electrode active material-containing layer was 184 mm so as to obtain the positive electrode.

[Assembly of Battery]

A battery was produced in the same manner as in Example 1 except for the following points.

First, the negative electrode and the positive electrode produced by the above-described procedure were used. The number of windings and the pressing pressure were adjusted so that the thickness B of the obtained electrode group was 1.67 cm.

The battery of Comparative Example 3 was a nonaqueous electrolyte battery having a thickness of 17 mm, a width of 88 mm, and a height of 240 mm.

Comparative Example 4

In Comparative Example 4, a nonaqueous electrolyte battery was produced in the same manner as in Comparative Example 3 except for the following points.

In the production of the negative electrode, roll pressing was performed so that the thickness of the composite was 68.4 μm. The composite was cut so that the coating width of the negative electrode active material-containing layer was 185 mm so as to obtain the negative electrode. Furthermore, in the production of the positive electrode, roll pressing was performed so that the thickness of the composite was 51.7 μm. In addition, the composite was cut so that the coating width of the positive electrode active material-containing layer was 184 mm so as to obtain the positive electrode. In the production of the electrode group, the number of windings and the pressing pressure were adjusted so that the thickness B of the obtained electrode group was 1.67 cm.

The battery of Comparative Example 4 was a nonaqueous electrolyte battery having a thickness of 17 mm, a width of 88 mm, and a height of 240 mm.

Comparative Example 5

In Comparative Example 5, a nonaqueous electrolyte battery was produced in the same manner as in Comparative Example 3 except for the following points.

In the production of the negative electrode, roll pressing was performed so that the thickness of the composite was 155.6 μm. The composite was cut so that the coating width of the negative electrode active material-containing layer was 93 mm so as to obtain the negative electrode. Furthermore, in the production of the positive electrode, roll pressing was performed so that the thickness of the composite was 112.9 μm. In addition, the composite was cut so that the coating width of the positive electrode active material-containing layer was 92 mm so as to obtain the positive electrode. Then, in the production of the electrode group, the number of windings and the pressing pressure were adjusted so that the thickness B of the obtained electrode group was 2.0 cm. The obtained electrode group was housed in an aluminum container.

The battery of Comparative Example 5 was a nonaqueous electrolyte battery having a thickness of 21 mm, a width of 115 mm, and a height of 105 mm.

Regarding each of the batteries of Examples 1 to 6 and Comparative Examples 1 to 5, the area (facing area) A [$cm^2$] of the portion of the negative electrode active material-containing layer that faces the positive electrode active material-containing layer in the electrode group and the thickness B [cm] of the electrode group are shown in Table 1 below. In addition, the rated capacity of each battery is shown in Table 1 below. The facing area, thickness of the electrode group, and rated capacity were measured by the above-described procedures.

TABLE 1

| | Facing Area A [$cm^2$] | Thickness of Electrode Group B [cm] | Rated capacity [Ah] | Ratio A/B |
|---|---|---|---|---|
| Example 1 | 19120 | 1.67 | 50.1 | 11449 |
| Example 2 | 23760 | 1.67 | 46.2 | 14226 |
| Example 3 | 15370 | 2.0 | 29.9 | 7685 |
| Example 4 | 13840 | 2.0 | 25.8 | 6920 |
| Example 5 | 46890 | 3.47 | 122 | 13513 |
| Example 6 | 76930 | 4.27 | 149 | 18016 |
| Comparative Example 1 | 32080 | 1.67 | 41.8 | 19209 |
| Comparative Example 2 | 11850 | 2.0 | 31.1 | 5925 |
| Comparative Example 3 | 18540 | 1.67 | 34.5 | 11102 |
| Comparative Example 4 | 32020 | 1.67 | 28.5 | 19174 |
| Comparative Example 5 | 11000 | 2.0 | 25.5 | 5500 |

<Rapid Charging Performance Test at Low Temperature>

The rapid charging performance of each battery at a low temperature was evaluated by the following procedure.

First, the battery was discharged at a constant current of 5 A in a 25° C. environment until a voltage of 1.5 V was reached. Thereafter, the battery was charged at a constant current of 0.2 C until a state-of-charge (SOC) reached 300 of the rated capacity (SOC30%). The battery in this state was subjected to a rapid charge test at 0° C. and a rapid charge test at 25° C. by the following procedures.

<Rapid Charge Test at 0° C.>

An environmental temperature was adjusted so that a surface temperature of the battery was 0° C.±3° C. This environmental temperature was then maintained for 3 hours. Next, the battery was placed in an open circuit state. Subsequently, the battery was then charged at a constant current of 10 C for 10 seconds.

A resistance value at this time was calculated as follows. First, a voltage before current application was defined as $V_0$. On the other hand, a voltage when charged for 10 seconds was defined as $V_{10}$. Values of the voltage $V_0$ and the voltage $V_{10}$ and a value of a current value $I_{10C}$ corresponding to a 10 C rate were substituted into $V_0$, $V_{10}$, and $I_{10C}$, respectively, of the following formula (A) to calculate a 10 second resistance $R_{10sec}$.

$$R_{10sec} = |V_{10} - V_0|/I_{10C} \tag{A}$$

The 10 second resistance value $R_{10sec}$ thus calculated was defined as a 10 C charging resistance value $R_0$ at 0° C.

<Rapid Charge Test at 25° C.>

An environmental temperature was adjusted so that a surface temperature of the battery was 25° C.±3° C. This environmental temperature was then maintained for 3 hours. Next, the battery was placed in an open circuit state. Subsequently, the battery was charged at a constant current of 10 C for 10 seconds. A resistance value (a 10 C charging resistance value $R_{25}$ at 25° C.) at this time was calculated by the same procedure as described above.

A ratio $R_0/R_{25}$ (i.e., a ratio of the 10 C charging resistance value $R_0$ at 0° C. to the 10 C charging resistance value $R_{25}$ at 25° C.) of each battery was used as an index of the rapid charging performance at a low temperature. The lower the ratio $R_0/R_{25}$, the lower the resistance value of a battery when rapidly charged at a low temperature, which means that the battery has an excellent rapid charging performance at a low temperature.

<Charge-and-Discharge Cycle Test>

The cycle life of each battery was evaluated by the following procedure.

First, the batteries were placed in a temperature environment of 55° C. In this temperature environment, the battery was subjected to 1000 charge-and-discharge cycles. In one cycle, the battery was first charged at a constant current of 1 C until the battery voltage reached 3.0 V. The battery was then continuously charged at a constant voltage of 3.0 V, and when a current value converged to 0.05 C, the charging was stopped. Next, the battery was discharged at a constant current of 1 C, and the discharging was stopped when the battery voltage reached 1.5 V. A discharge capacity of the battery was measured before and after the charge-and-discharge cycles. A discharge capacity after being subjected to the 1000 charge-and-discharge cycles was divided by a discharge capacity before being subjected to the first charge-and-discharge cycle to obtain a discharge capacity retention ratio [%] after the 1000 cycles.

Results of the above evaluations are shown in Tables 2 and 3 below.

In Table 2, results of the batteries of Examples 1, 2, 5, and 6 and Comparative Example 1 are shown as relative values with the results of Comparative Example 1 as references (1.000). In Table 3, results of the batteries of Examples 3 and 4 and Comparative Example 2 are shown as relative values with the results of Comparative Example 2 as references (1.000). In Table 4, results of the batteries of Comparative Examples 3 to 5 are shown as relative values with the results of Comparative Example 4 as references (1.000).

TABLE 2

|  | Ratio $R_0/R_{25}$ (Relative Value) | Discharge Capacity Retention Ratio after 1000 Cycles (Relative Value) |
|---|---|---|
| Example 1 | 0.769 | 1.103 |
| Example 2 | 0.731 | 1.128 |
| Example 5 | 0.769 | 1.038 |
| Example 6 | 0.846 | 1.026 |

TABLE 2-continued

|  | Ratio $R_0/R_{25}$ (Relative Value) | Discharge Capacity Retention Ratio after 1000 Cycles (Relative Value) |
|---|---|---|
| Comparative Example 1 | 1.000 | 1.000 |

TABLE 3

|  | Ratio $R_0/R_{25}$ (Relative Value) | Discharge Capacity Retention Ratio after 1000 Cycles (Relative Value) |
|---|---|---|
| Example 3 | 0.697 | 1.065 |
| Example 4 | 0.727 | 1.065 |
| Comparative Example 2 | 1.000 | 1.000 |

TABLE 4

|  | Ratio $R_0/R_{25}$ (Relative Value) | Discharge Capacity Retention Ratio after 1000 Cycles (Relative Value) |
|---|---|---|
| Comparative Example 3 | 0.952 | 0.989 |
| Comparative Example 4 | 1.000 | 1.000 |
| Comparative Example 5 | 0.952 | 0.989 |

As is apparent from Tables 1 and 2, the batteries of Examples 1, 2, 5, and 6, in which the ratio A/B was in the range of 6500≤A/B≤18500, exhibited a more excellent cycle life and a more excellent rapid charging performance in a low-temperature environment than the battery of Comparative Example 1, in which the ratio A/B was outside this range. As is apparent from Tables 1 and 3, the batteries of Examples 3 and 4, in which the ratio A/B was in the range of 6500≤A/B≤18500, exhibited a more excellent cycle life and a more excellent rapid charging performance in a low-temperature environment than the battery of Comparative Example 2, in which the ratio A/B was outside this range.

On the other hand, as is apparent from Tables 1 and 4, regarding the batteries including a negative electrode in which a negative electrode active material-containing layer contains spinel-type lithium titanate, all of the battery of Comparative Example 3, in which the ratio A/B was in the range of 6500≤A/B≤18500, and the batteries of Comparative Examples 4 and 5, in which the ratio A/B was outside this range, exhibited a comparable cycle life and a comparable rapid charging performance in a low-temperature environment. From the above results, it is understood that, in the electrode group in which the negative electrode active material-containing layer does not contain any of a monoclinic niobium titanium composite oxide and an orthorhombic titanium-containing composite oxide, even if the ratio A/B is set to 6500≤A/B≤18500, the battery performances cannot be improved.

The electrode group of at least one of the embodiments or examples includes a positive electrode including a positive electrode active material-containing layer and a negative electrode including a negative electrode active material-containing layer. The negative electrode active material-containing layer contains at least one titanium-containing composite oxide selected from the group consisting of a monoclinic niobium titanium composite oxide and an orthorhombic titanium-containing composite oxide. At least a part of the negative electrode active material-containing layer faces at least a part of the positive electrode active material-containing layer. This electrode group satisfies the formula: $6500 \leq A/B \leq 18500$. This electrode group can sufficiently suppress heat generation from the electrode group, and sufficiently dissipate heat from the electrode group. In addition, this electrode group can sufficiently suppress an increase in resistance value even when a large voltage is applied. This electrode group can generate heat sufficient to enhance the rapid charging performance of the battery during charging in a low-temperature environment. As a result, this electrode group can realize a battery capable of exhibiting an excellent cycle life and an excellent rapid charging performance in a low-temperature environment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed:

1. An electrode group comprising:
 a positive electrode including a positive electrode active material-containing layer; and
 a negative electrode including a negative electrode active material-containing layer containing at least one titanium-containing composite oxide selected from the group consisting of a monoclinic niobium titanium composite oxide and an orthorhombic titanium-containing composite oxide, wherein
 at least a part of the negative electrode active material-containing layer faces at least a part of the positive electrode active material-containing layer, and
 the electrode group satisfies the following formula:

$$6500 \leq A/B \leq 18500,$$

where A is an area [cm$^2$] of a portion of the negative electrode active material-containing layer that faces the positive electrode active material-containing layer, and B is a thickness [cm] of the electrode group.

2. The electrode group according to claim 1, wherein the at least one titanium-containing composite oxide includes the monoclinic niobium titanium composite oxide.

3. The electrode group according to claim 1, wherein the positive electrode active material-containing layer includes a lithium nickel cobalt manganese composite oxide.

4. A battery comprising:
 the electrode group according to claim 1; and
 an electrolyte.

5. The battery according to claim 4, wherein a rated capacity is from 25 Ah to 150 Ah.

6. A battery pack comprising the battery according to claim 4.

* * * * *